(12) United States Patent
Okuyama et al.

(10) Patent No.: US 9,912,519 B2
(45) Date of Patent: Mar. 6, 2018

(54) TRANSMISSION MANAGEMENT APPARATUS, TRANSMISSION SYSTEM, AND COMPUTER-READABLE RECORDING MEDIUM

(71) Applicants: Taro Okuyama, Tokyo (JP); Takahiro Asai, Kanagawa (JP)

(72) Inventors: Taro Okuyama, Tokyo (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1219 days.

(21) Appl. No.: 13/715,075

(22) Filed: Dec. 14, 2012

(65) Prior Publication Data

US 2013/0173800 A1    Jul. 4, 2013

(30) Foreign Application Priority Data

Dec. 28, 2011   (JP) ................................ 2011-289047
Apr. 20, 2012   (JP) ................................ 2012-097008

(51) Int. Cl.
*G06F 15/173*   (2006.01)
*H04L 12/24*   (2006.01)
(Continued)

(52) U.S. Cl.
CPC ............ *H04L 41/04* (2013.01); *H04L 12/185* (2013.01); *H04L 41/22* (2013.01); *H04L 65/4038* (2013.01)

(58) Field of Classification Search
USPC ........ 709/220, 215, 203, 225; 370/335, 353, 370/352; 715/853, 224
See application file for complete search history.

(56) References Cited

U.S. PATENT DOCUMENTS 6,047,288 A     4/2000  Kurosawa et al.
6,760,320 B1 *  7/2004  Bune ................... H04W 52/08
                                               370/335
(Continued)

FOREIGN PATENT DOCUMENTS

EP    1 753 180 A1    2/2007
EP    1 365 557 A2    11/2013
(Continued)

OTHER PUBLICATIONS

Office Action dated Jan. 26, 2016 in Japanese Patent Application No. 2012-097008.
(Continued)

*Primary Examiner* — Tammy Nguyen
(74) *Attorney, Agent, or Firm* — Oblon, McClelland, Maier & Neustadt, L.L.P.

(57) ABSTRACT

An apparatus includes a storage unit configured to store therein, in association with one another, group identification information for identifying groups to which transmission terminals each belong, transmission terminal identification information for identifying the terminals belonging to the respective groups, and display information to be displayed on the transmission terminals belonging to the groups. The apparatus also includes an acquiring unit configured to acquire the group identification information of a certain group and a change instruction for the display information; a changing unit configured to change the display information associated with the group identification information in the storage unit based on the change instruction; and a transmitting unit configured to transmit the display information associated with the certain group in the storage unit and changed to the terminal identified by the transmission terminal identification information associated with the group (Continued)

identification information of the certain group in the storage unit.

7 Claims, 25 Drawing Sheets

(51) Int. Cl.
*H04L 29/06* (2006.01)
*H04L 12/18* (2006.01)

(56) References Cited

U.S. PATENT DOCUMENTS

| | | | | |
|---|---|---|---|---|
| 7,123,608 | B1* | 10/2006 | Scott | H04M 3/2218 370/353 |
| 7,457,279 | B1* | 11/2008 | Scott | H04L 45/02 370/352 |
| 8,456,662 | B2* | 6/2013 | Katano | G06F 3/1204 358/1.14 |
| 2003/0122879 | A1* | 7/2003 | Inui | G06F 9/4443 715/853 |
| 2004/0024912 | A1 | 2/2004 | Fukao et al. | |
| 2009/0059280 | A1* | 3/2009 | Yamaguchi | H04N 1/00214 358/1.15 |
| 2011/0138058 | A1 | 6/2011 | Ishida | |
| 2011/0219060 | A1* | 9/2011 | Ohwada | G06F 15/16 709/203 |
| 2013/0173800 | A1* | 7/2013 | Okuyama | H04L 41/22 709/225 |
| 2015/0363377 | A1* | 12/2015 | Dojo | G06F 17/243 715/224 |

FOREIGN PATENT DOCUMENTS

| | | |
|---|---|---|
| EP | 1 365 557 A3 | 11/2013 |
| JP | 9-034844 | 2/1997 |
| JP | 2002-204236 | 7/2002 |
| JP | 2007-34703 | 2/2007 |
| JP | 2009-157459 | 7/2009 |
| JP | 2009-169913 A | 7/2009 |
| JP | 2011-060057 | 3/2011 |
| JP | 2011-254453 A | 12/2011 |

OTHER PUBLICATIONS

Extended Search Report dated May 8, 2013 in European Patent Application No. 12198476.9.

* cited by examiner

FIG.7

TERMINAL AUTHENTICATION
MANAGEMENT TABLE

| TERMINAL ID | PASSWORD |
|---|---|
| 10aa | aaaa |
| 10ab | abab |
| 10ba | baba |
| ... | ... |

FIG.8

TERMINAL MANAGEMENT TABLE

| TERMINAL ID | LOCATED POSITION OF TERMINAL | OPERATING STATUS | RECEPTION DATE AND TIME | IP ADDRESS OF TERMINAL |
|---|---|---|---|---|
| 10aa | JAPAN TOKYO OFFICE TERMINAL AA | ON-LINE (CAPABLE OF TRANSMITTING) | 2009.11.10.13:40 | 1.2.1.3 |
| 10ab | JAPAN TOKYO OFFICE TERMINAL AB | OFF-LINE | 2009.11.09.12:00 | 1.2.1.4 |
| 10ac | JAPAN TOKYO OFFICE TERMINAL AC | ON-LINE (TEMPORARILY BEING INTERRUPTED) | 2009.11.10.13:11 | 1.2.1.5 |
| ... | ... | ... | ... | ... |
| 10ba | JAPAN OSAKA OFFICE TERMINAL BA | ON-LINE (TEMPORARILY BEING INTERRUPTED) | 2009.11.10.13:45 | 1.2.2.3 |
| 10bb | JAPAN OSAKA OFFICE TERMINAL BB | ON-LINE (CAPABLE OF TRANSMITTING) | 2009.11.10.13:50 | 1.2.2.4 |
| ... | ... | ... | ... | ... |
| 10ca | THE UNITED STATES NEW YORK OFFICE TERMINAL CA | OFF-LINE | 2009.11.10.12:45 | 1.3.1.3 |
| 10cb | THE UNITED STATES NEW YORK OFFICE TERMINAL CB | ON-LINE (BEING TRANSMITTING) | 2009.11.10.13:55 | 1.3.1.4 |
| ... | ... | ... | ... | ... |
| 10da | THE UNITED STATES WASHINGTON, D.C. OFFICE TERMINAL DA | ON-LINE (BEING TRANSMITTING) | 2009.11.08.12:45 | 1.3.2.3 |
| 10db | THE UNITED STATES WASHINGTON, D.C. OFFICE TERMINAL DB | ON-LINE (CAPABLE OF TRANSMITTING) | 2009.11.10.12:45 | 1.3.2.4 |
| ... | ... | ... | ... | ... |

FIG.9

DESTINATION LIST MANAGEMENT TABLE

| TERMINAL ID | DESTINATION TERMINAL ID | TERMINAL NAME OF DESTINATION TERMINAL |
|---|---|---|
| 10aa | 10ab | JAPAN TOKYO OFFICE TERMINAL AB |
| 10aa | 10ac | JAPAN TOKYO OFFICE TERMINAL AC |
| 10aa | 10ad | JAPAN TOKYO OFFICE TERMINAL AD |
| 10aa | 10ae | JAPAN TOKYO OFFICE TERMINAL AE |
| 10ab | 10ac | JAPAN TOKYO OFFICE TERMINAL C |
| 10bb | 10be | JAPAN OSAKA OFFICE TERMINAL BE |
| ... | ... | ... |

FIG.10

GROUP MANAGEMENT TABLE

| GROUP ID | GROUP NAME | PASSWORD | BELONGING TERMINAL ID |
|---|---|---|---|
| g001 | T CORPORATION JAPAN TOKYO OFFICE | ggg | 10aa, 10ab, 10ac, 10ad, 10ae |
| g002 | T CORPORATION JAPAN OSAKA OFFICE | ggf | 10be, 10bf, ... |
| ... | ... | ... | ... |

FIG.13

| STATUS | TERMINAL ID | TERMINAL NAME |
|---|---|---|
| 📞 | 10ab | JAPAN TOKYO OFFICE TERMINAL AB |
| 📞 | 10ac | JAPAN OSAKA OFFICE TERMINAL AC |
| 📞 | 10ad | JAPAN TOKYO OFFICE TERMINAL AD |
| 📞 | 10ae | JAPAN TOKYO OFFICE TERMINAL AE |

ADD DESTINATION

FIG.18

DESTINATION LIST MANAGEMENT TABLE

| TERMINAL ID | DESTINATION TERMINAL ID | TERMINAL NAME OF DESTINATION TERMINAL |
|---|---|---|
| 10aa | 10ab | JAPAN TOKYO OFFICE TERMINAL AB |
| 10aa | 10ac | JAPAN OSAKA OFFICE TERMINAL AC |
| 10aa | 10ad | JAPAN TOKYO OFFICE TERMINAL AD |
| 10aa | 10ae | JAPAN TOKYO OFFICE TERMINAL AE |
| 10ab | 10ac | JAPAN TOKYO OFFICE TERMINAL C |
| 10bb | 10be | JAPAN OSAKA OFFICE TERMINAL BE |
| ... | ... | ... |

FIG.19

| STATUS | TERMINAL ID | TERMINAL NAME |
|---|---|---|
|  | 10ab | JAPAN TOKYO OFFICE TERMINAL AB |
|  | 10ac | JAPAN OSAKA OFFICE TERMINAL AC |
|  | 10ad | JAPAN TOKYO OFFICE TERMINAL AD |
|  | 10ae | JAPAN TOKYO OFFICE TERMINAL AE |

ADD DESTINATION

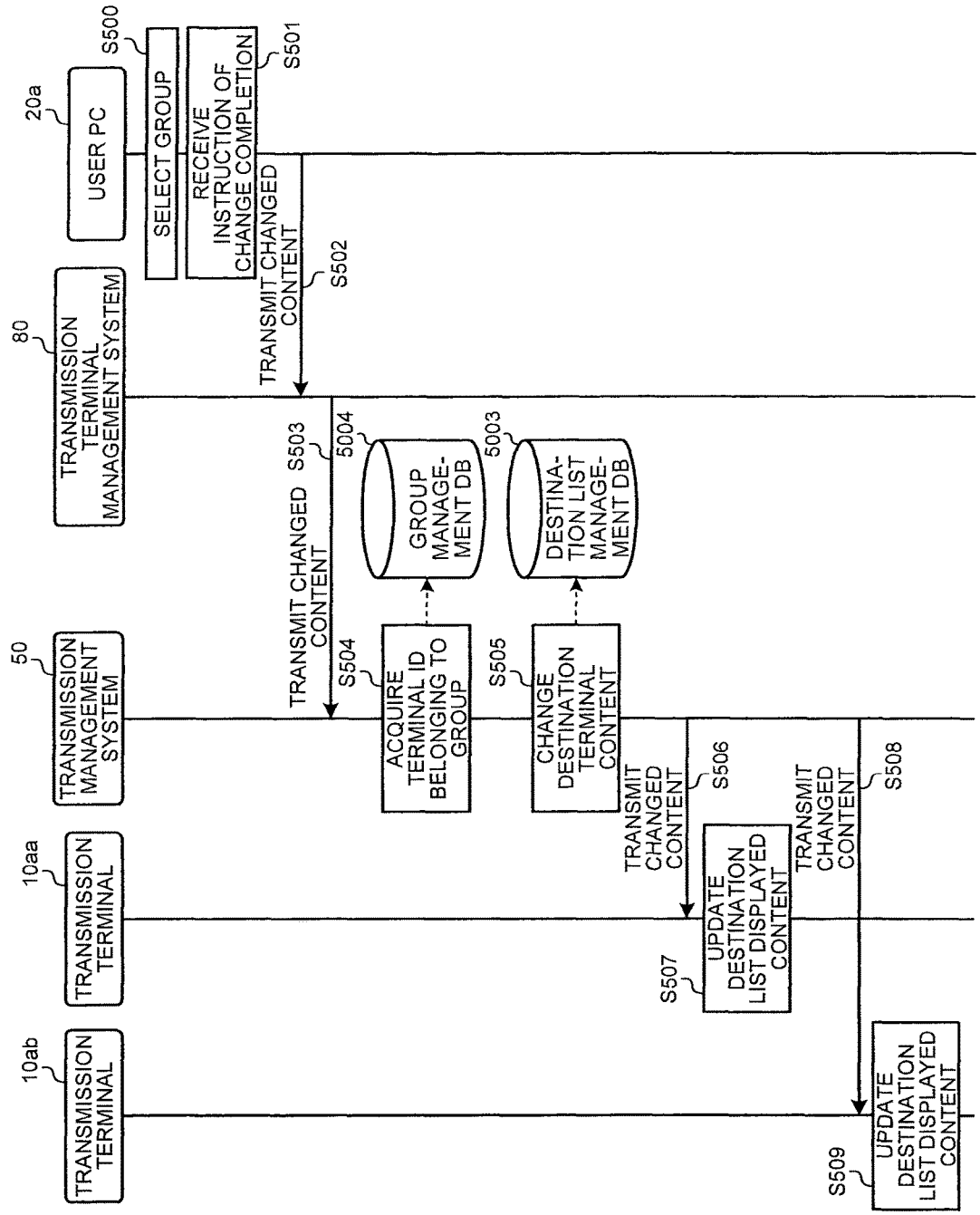

FIG.22

| JAPAN TOKYO OFFICE TERMINAL AA | T CORPORATION JAPAN TOKYO OFFICE |

ADD DESTINATION

| TERMINAL NAME | TERMINAL ID | OPERATION |
|---|---|---|
| JAPAN TOKYO OFFICE TERMINAL AA | 10aa | EDIT \| DELETE |
| JAPAN TOKYO OFFICE TERMINAL AB | 10ab | EDIT \| DELETE |
| JAPAN TOKYO OFFICE TERMINAL AC | 10ac | EDIT \| DELETE |
| JAPAN TOKYO OFFICE TERMINAL AD | 10ad | EDIT \| DELETE |
| JAPAN TOKYO OFFICE TERMINAL AE | 10ae | EDIT \| DELETE |

FIG.23

DESTINATION LIST MANAGEMENT TABLE

| TERMINAL ID | DESTINATION TERMINAL ID | TERMINAL NAME OF DESTINATION TERMINAL |
|---|---|---|
| 10aa | 10ab | JAPAN TOKYO OFFICE TERMINAL AB |
| 10aa | 10ac | JAPAN OSAKA OFFICE TERMINAL AC |
| 10aa | 10ad | JAPAN TOKYO OFFICE TERMINAL AD |
| 10aa | 10ae | JAPAN TOKYO OFFICE TERMINAL AE |
| 10ab | 10ac | JAPAN OSAKA OFFICE TERMINAL AC |
| 10bb | 10be | JAPAN OSAKA OFFICE TERMINAL BE |
| ... | ... | ... |

FIG.26

| TERMINAL NAME | NOTE |
|---|---|
| REFRIGERATOR | PUT OUT BURNABLE WASTE BY Dec. 30th |
| RICE COOKER | HANDLE WITH CARE |
| MICROWAVE | PUT OUT BURNABLE WASTE BY Dec. 30th |
| TOASTER | TO BE THROWN AWAY |
| DISHWASHER | SAVE ELECTRICITY! |

DISPLAY INFORMATION MANAGEMENT TABLE

| TERMINAL ID | NOTE (DISPLAY INFORMATION) |
|---|---|
| 21aa | PUT OUT BURNABLE WASTE BY Dec. 30th |
| 21ab | HANDLE WITH CARE |
| 21ac | PUT OUT BURNABLE WASTE BY Dec. 30th |
| 21ad | TO BE THROWN AWAY |
| ⋮ | ⋮ |

GROUP MANAGEMENT TABLE

| GROUP ID | GROUP NAME | PASSWORD | BELONGING TERMINAL ID |
|---|---|---|---|
| g011 | KITCHEN | fff | 21aa, 21ab, ⋯ |
| g012 | BED ROOM | ffg | 21ba, 21ca, ⋯ |
| ⋯ | ⋯ | ⋯ | ⋯ |

FIG.34

DISPLAY INFORMATION MANAGEMENT TABLE

| TERMINAL ID | NOTE (DISPLAY INFORMATION) |
|---|---|
| 21aa | POWER SUPPLY WILL BE CUT OFF TOMORROW |
| 21ab | POWER SUPPLY WILL BE CUT OFF TOMORROW |
| 21ac | PUT OUT BURNABLE WASTE BY Dec. 30th |
| 21ad | TO BE THROWN AWAY |
| ⋮ | ⋮ |

TRANSMISSION MANAGEMENT APPARATUS, TRANSMISSION SYSTEM, AND COMPUTER-READABLE RECORDING MEDIUM

CROSS-REFERENCE TO RELATED APPLICATIONS

The present application claims priority to and incorporates by reference the entire contents of Japanese Patent Application No. 2011-289047 filed in Japan on Dec. 28, 2011 and Japanese Patent Application No. 2012-097008 filed in Japan on Apr. 20, 2012.

BACKGROUND OF THE INVENTION

1. Field of the Invention

The present invention relates to a transmission management apparatus, a transmission system, and a method and a computer-readable recording medium for transmission management.

2. Description of the Related Art

Conventionally, with the development of cloud computing, various types of devices have been used as a client terminal for cloud services besides personal computer (PC) terminals. Not to mention smartphones and tablet terminals, televisions and video conference terminals are also used as a terminal for cloud services. It is expected that more devices will be connected to a network to operate as a client terminal for cloud services.

The conventional devices used as a client terminal, however, do not necessarily have a user interface suitable for inputting characters, for example. Televisions and video conference terminals have no keyboard, for example, and a user can only use limited keys of a remote control to perform operations. As a result, the user typically has trouble inputting characters compared with the case of inputting characters with a keyboard. Furthermore, in the case of a small device without even a remote control, the user needs to input characters using further limited keys and has more trouble inputting characters.

In terms of a technology for simplifying user operations, Japanese Patent Application Laid-open No. 2009-157459 discloses an electronic device system that displays an operation screen for operating an electronic device on a user terminal device without any operation performed by a user, for example.

Therefore, there is a need for a transmission management apparatus, a transmission system, and a method and a computer-readable recording medium for transmission management capable of simplifying user operations.

SUMMARY OF THE INVENTION

It is an object of the present invention to at least partially solve the problems in the conventional technology.

According to an embodiment, there is provided a transmission management apparatus for managing transmission among a plurality of transmission terminals connected to a network. The transmission management apparatus includes a display information storage unit configured to store therein, in association with one another, group identification information for identifying groups to which the transmission terminals each belong, transmission terminal identification information for identifying the transmission terminals belonging to the respective groups, and display information to be displayed on the transmission terminals belonging to the groups. The transmission management apparatus also includes an acquiring unit configured to acquire the group identification information of a certain group and a change instruction for the display information; a changing unit configured to change the display information associated with the group identification information acquired by the acquiring unit in the display information storage unit based on the change instruction; and a transmitting unit configured to transmit the display information associated with the certain group in the display information storage unit and changed by the changing unit to the transmission terminal identified by the transmission terminal identification information associated with the group identification information of the certain group in the display information storage unit.

According to another embodiment, there is provided a transmission system that includes a transmission management apparatus configured to manage transmission among a plurality of transmission terminals connected to a network; and a transmission terminal management apparatus configured to manage the transmission terminals. The transmission terminal management apparatus includes a receiving unit configured to receive group identification information for identifying a group to which the transmission terminal used by a user belongs and a change instruction for display information to be displayed on the transmission terminal from a user terminal; and a transmitting unit configured to transmit the group identification information and the change instruction received by the receiving unit to the transmission management apparatus. The transmission management apparatus includes a receiving unit configured to receive the group identification information and the change instruction from the transmission terminal management apparatus; a display information storage unit configured to store therein, in association with one another, group identification information for identifying groups to which the transmission terminals each belong, transmission terminal identification information for identifying the transmission terminals belonging to the respective groups, and display information to be displayed on the transmission terminals belonging to the groups; a changing unit configured to change the display information associated with the group identification information received by the receiving unit in the display information storage unit based on the change instruction; and a transmitting unit configured to transmit the display information associated with a certain group in the display information storage unit and changed by the changing unit to the transmission terminal identified by the transmission terminal identification information associated with the group identification information of the certain group in the display information storage unit.

According to still another embodiment, there is provided a computer-readable recording medium with an executable program stored thereon for managing transmission among a plurality of transmission terminals connected to a network by a computer that includes a display information storage unit configured to store therein, in association with one another, group identification information for identifying groups to which the transmission terminals each belong, transmission terminal identification information for identifying the transmission terminals belonging to the respective groups, and display information to be displayed on the transmission terminals belonging to the groups. The program instructs the computer to perform: acquiring the group identification information of a certain group and a change instruction for the display information; changing the display information associated with the acquired group identification information in the display information storage unit based on the change instruction; and transmitting the display information associated with the certain group in the display information storage unit and changed at the changing to the transmission terminal identified by the transmission terminal identification information associated with the group identification information of the certain group in the display information storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a conceptual diagram of a terminal authentication management table;

FIG. 8 is a conceptual diagram of a terminal management table;

FIG. 9 is a conceptual diagram of a destination list management table;

FIG. 10 is a conceptual diagram of a group management table;

FIG. 13 is a conceptual diagram of a destination list screen;

FIG. 18 is a view of the destination list management table updated with a changed content;

FIG. 19 is a view of the destination list screen updated with the changed content;

FIG. 21 is another sequence diagram of processing for editing destination information collectively in group units;

FIG. 22 is a conceptual diagram of the destination list edit screen in group units;

FIG. 23 is a view of a group destination list management table being updated;

FIG. 26 is a conceptual diagram of a display information list screen;

FIG. 34 is a conceptual diagram of a display information management table updated with a changed content.

DETAILED DESCRIPTION OF THE PREFERRED EMBODIMENTS

Exemplary embodiments of a transmission management apparatus, a transmission system, and a method and a computer program for transmission management according to the present invention are described below in greater detail with reference to the accompanying drawings.

First Embodiment

Figure 1:
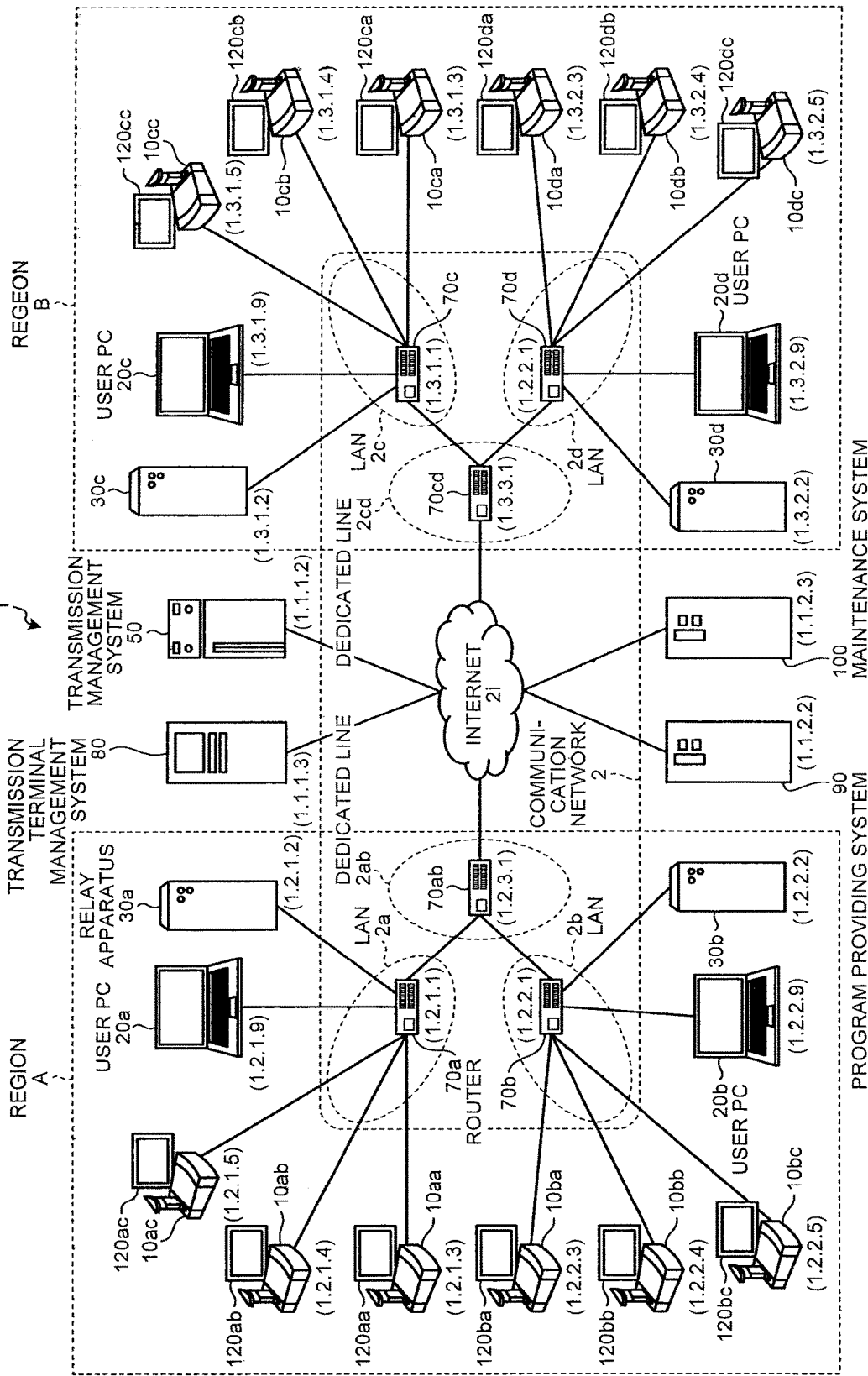
FIG. 1 is a schematic of a transmission system according to a first embodiment of the present invention.

FIG. 1 is a schematic of a transmission system according to a first embodiment of the present invention. A transmission system 1 includes a communication system in which information, feelings, and the like are transmitted among a plurality of transmission terminals 10 via a transmission management system 50. The communication system is a system for transmitting information, feelings, and the like among a plurality of communication terminals (corresponding to "transmission terminals") via a communication management system (corresponding to a "transmission management system"). Examples of the communication system include a video conference system and a television phone system.

In the present embodiment, the transmission system, the transmission management system, and the transmission terminal are explained using a video conference system as an example of the communication system, a video conference management system as an example of the communication management system, and a video conference terminal as an example of the communication terminal, respectively. In other words, the transmission terminal and the transmission management system according to the present embodiment are not necessarily applied to a video conference system and may be applied to other communication systems.

In the present embodiment, an explanation will be made of the case where users of the transmission system 1 are at the four offices of Tokyo Office (a user a), Osaka Office (a user b), New York Office (a user c), and Washington, D.C. Office (a user d).

The transmission system 1 illustrated in FIG. 1 includes a plurality of transmission terminals (10aa, 10ab, . . . ), displays (120aa, 120ab, . . . ) for the transmission terminals (10aa, 10ab, . . . ), a plurality of user personal computers (PCs) (20a, 20b, 20c, and 20d), a plurality of relay apparatuses (30a, 30b, 30c, and 30d), the transmission management system 50, a transmission terminal management system 80, a program providing system 90, and a maintenance system 100.

In the description below, an arbitrary transmission terminal among the transmission terminals (10*aa*, 10*ab*, . . . ) is referred to as a "transmission terminal 10", and an arbitrary user PC among the user PCs (20*a*, 20*b*, 20*c*, and 20*d*) is referred to as a "user PC 20". Furthermore, an arbitrary display among the displays (120*aa*, 120*ab*, . . . ) is referred to as a "display 120", and an arbitrary relay apparatus among the relay apparatuses (30*a*, 30*b*, 30*c*, and 30*d*) is referred to as a "relay apparatus 30".

A transmission terminal serving as a requestor that requests start of a video conference is referred to as a "requestor terminal", and a transmission terminal serving as a destination (relay destination), which is the requested, is referred to as a "destination terminal". Furthermore, an arbitrary router among a plurality of routers (70*a*, 70*b*, 70*c*, 70*d*, 70*ab*, and 70*cd*) is referred to as a "router 70".

The transmission terminal 10 illustrated in FIG. 1 performs transmission by transmitting and receiving image data and audio data serving as an example of content data. The image data may be moving image data or still image data or include both moving image data and still image data. The user PC 20 transmits various types of requests to the transmission terminal management system 80 in response to an input from the user.

The relay apparatus 30 relays content data among the transmission terminals 10. The transmission management system 50 integrally manages login authentication of the transmission terminal 10, a call status of the transmission terminal 10, a destination list, and a communication status of the relay apparatus 30, for example. The router 70 selects the optimum path for the image data and the audio data. The transmission terminal management system 80 performs processing related to requests issued from the user PC 20.

The program providing system 90 includes a hard disk (HD) 204, which will be described later. The HD 204 stores therein a terminal program for realizing various types of functions in the transmission terminal 10 (or causing the transmission terminal 10 to function as various types of units), and the program providing system 90 can transmit the terminal program to the transmission terminal 10. Furthermore, the HD 204 of the program providing system 90 stores therein a relay apparatus program for realizing various types of functions in the relay apparatus 30 (or causing the relay apparatus 30 to function as various types of units), and the program providing system 90 can transmit the relay apparatus program to the relay apparatus 30.

The HD 204 of the program providing system 90 further stores therein a transmission management program and a transmission terminal management program for realizing various types of functions in the transmission management system 50 and the transmission terminal management system 80 (or causing the transmission management system 50 and the transmission terminal management system 80 to function as various types of units), respectively. The program providing system 90 can transmit the transmission management program and the transmission terminal management program to the transmission management system 50 and the transmission terminal management system 80, respectively.

The maintenance system 100 is a computer that keeps up, manages, or maintains at least one of the transmission terminal 10, the relay apparatus 30, the transmission management system 50, the transmission terminal management system 80, and the program providing system 90. If the maintenance system 100 is located in Japan and the transmission terminal 10, the relay apparatus 30, the transmission management system 50, the transmission terminal management system 80, or the program providing system 90 is located abroad, for example, the maintenance system 100 does maintenance such as upkeep, management, and maintenance on at least one of the transmission terminal 10, the relay apparatus 30, the transmission management system 50, the transmission terminal management system 80, and the program providing system 90 remotely via a communication network 2.

Furthermore, the maintenance system 100 does maintenance, such as management of a model number, a manufacturer's serial number, a purchaser, and maintenance and inspection or failure history, on at least one of the transmission terminal 10, the relay apparatus 30, the transmission management system 50, the transmission terminal management system 80, and the program providing system 90 not via the communication network 2.

The transmission terminals (10*aa*, 10*ab*, and 10*ac*), the user PC 20*a*, the relay apparatus 30*a*, and the router 70*a* are connected in a communicable manner via a local area network (LAN) 2*a*. The transmission terminals (10*ba*, 10*bb*, and 10*bc*), the user PC 20*b*, the relay apparatus 30*b*, and the router 70*b* are connected in a communicable manner via a LAN 2*b*. The LAN 2*a* and the LAN 2*b* are connected in a communicable manner via a dedicated line 2*ab* including the router 70*ab* and are established in a certain region A. The region A is Japan, for example, and the LAN 2*a* is established in the Tokyo Office, whereas the LAN 2*b* is established in the Osaka Office.

By contrast, the transmission terminals (10*ca*, 10*cb*, and 10*cc*), the user PC 20*c*, the relay apparatus 30*c*, and the router 70*c* are connected in a communicable manner via a LAN 2*c*. The transmission terminals (10*da*, 10*db*, and 10*dc*), the user PC 20*d*, the relay apparatus 30*d*, and the router 70*d* are connected in a communicable manner via a LAN 2*d*.

The LAN 2*c* and the LAN 2*d* are connected in a communicable manner via a dedicated line 2*cd* including the router 70*cd* and are established in a certain region B. The region B is the United States, for example, and the LAN 2*c* is established in the New York Office, whereas the LAN 2*d* is established in the Washington, D.C. Office. The region A and the region B are connected in a communicable manner via the Internet 2*i* with the routers (70*ab* and 70*cd*), respectively.

The transmission management system 50, the transmission terminal management system 80, the program providing system 90, and the maintenance system 100 are connected to the transmission terminal 10, the user PC 20, and the relay apparatus 30 in a communicable manner via the Internet 2*i*. The transmission management system 50, the transmission terminal management system 80, and the program providing system 90 may be located in the region A or the region B, or at regions other than the region A and the region B.

In the present embodiment, the LAN 2*a*, the LAN 2*b*, the dedicated line tab, the Internet 2*i*, the dedicated line 2*cd*, the LAN 2*c*, and the LAN 2*d* form the communication network 2 according to the present embodiment. The communication network 2 may include a section in which wireless communications are performed using Wireless Fidelity (Wi-Fi: registered trademark) and Bluetooth (registered trademark), for example, besides a section of wired communications.

In FIG. 1, four numbers each written under the transmission terminal 10, the relay apparatus 30, the transmission management system 50, the router 70, the transmission terminal management system 80, the program providing system 90, and the maintenance system 100 simply indicate an Internet Protocol (IP) address in the typical IPv4. The IP address of the transmission terminal 10aa is "1.2.1.3", for example. While the IPv6 may be used instead of the IPv4, an explanation will be made of the case where the IPv4 is used for the convenience of explanation.

The transmission terminal 10 may be used for a call in the same room and a call between outdoor and indoor or between outdoor and outdoor besides for a call among a plurality of offices and a call among different rooms in the same office. If the transmission terminal 10 is used outdoor, wireless communications are performed using a mobile phone communication network, for example.

Figure 2:
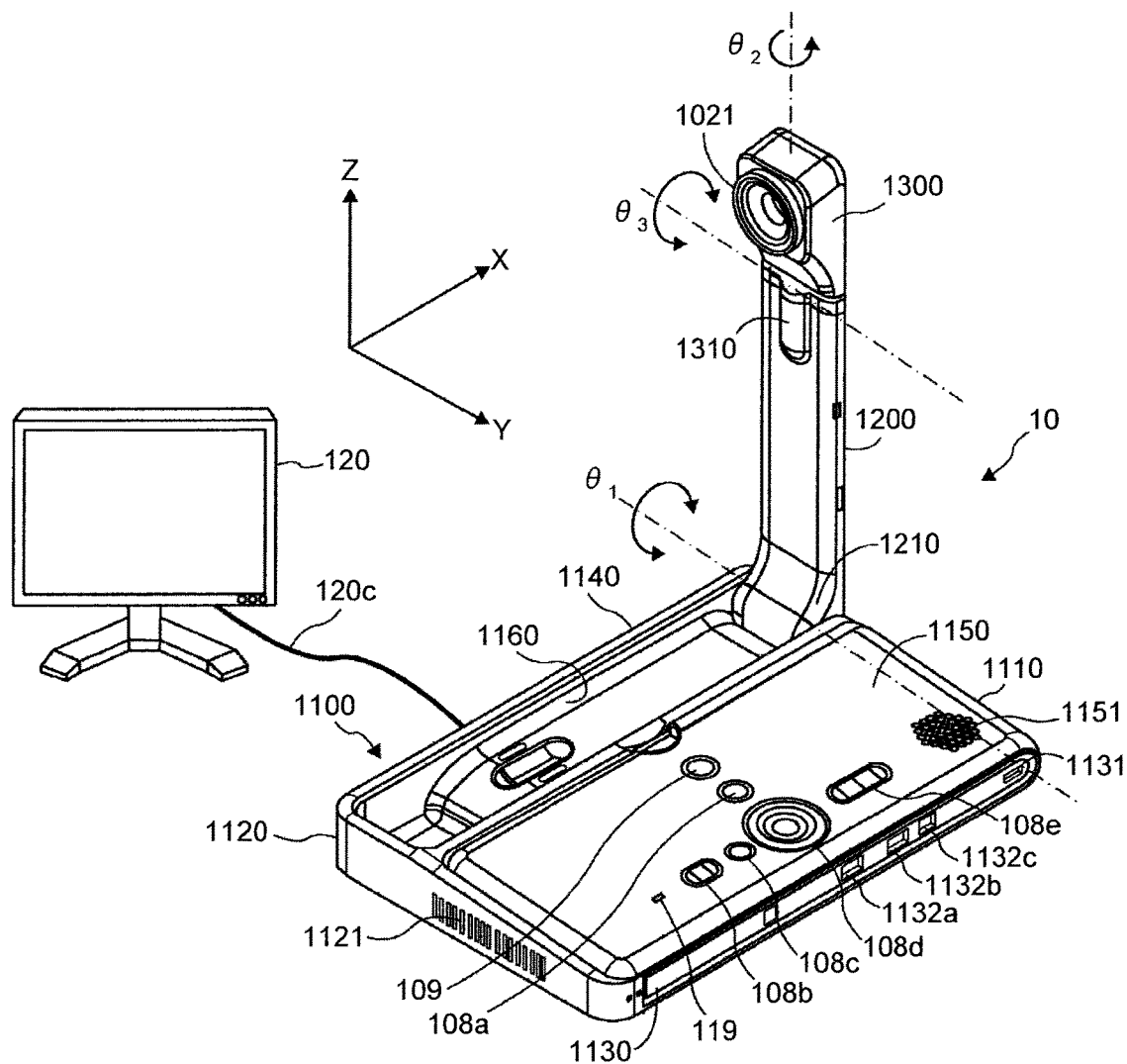
FIG. 2 is an external view of a transmission terminal.

A hardware configuration of the transmission system 1 according to the present embodiment will now be described. FIG. 2 is an external view of the transmission terminal 10 according to the present embodiment. In the description below, the longitudinal direction of the transmission terminal 10 is an X-axis direction, a direction orthogonal to the X-axis direction in the horizontal plane is a Y-axis direction, and a direction (vertical direction) orthogonal to the X-axis direction and the Y-direction is a Z-axis direction.

As illustrated in FIG. 2, the transmission terminal 10 includes a housing 1100, an arm 1200, and a camera housing 1300. A front-side wall 1110 of the housing 1100 is provided with an inlet surface, which is not illustrated, formed of a plurality of inlet holes, and a rear-side wall 1120 of the housing 1100 is provided with an outlet surface 1121 formed of a plurality of outlet holes. Thus, by driving a cooling fan housed in the housing 1100, it is possible to introduce outside air ahead of the transmission terminal 10 through the inlet surface, which is not illustrated, and to exhaust the outside air toward behind the transmission terminal 10 through the outlet surface 1121. A sound acquisition hole 1131 is formed on a right-side wall 1130 of the housing 1100, and sound, such as audio, sound, and noise, can be acquired therethough by a built-in microphone 114, which will be described.

An operation panel 1150 is formed on the right-side wall 1130 side of the housing 1100. The operation panel 1150 is provided with a plurality of operation buttons (108a to 108e), a power switch 109, and an alarm lamp 119, each of which will be described later. In addition, the operation panel 1150 has a sound output surface 1151 formed of a plurality of audio output holes through which output sound from a built-in speaker 115, which will be described later, is output.

A housing unit 1160 serving as a recess that houses the arm 1200 and the camera housing 1300 is formed on the left-side wall 1140 side of the housing 1100. The right-side wall 1130 of the housing 1100 is provided with a plurality of connection ports (1132a to 1132c) through which a cable is electrically connected to an external device connection interface (I/F) 118, which will be described later. By contrast, the left-side wall 1140 of the housing 1100 is provided with a connection port, which is not illustrated, through which a cable 120c for the display 120 is electrically connected to the external device connection I/F 118, which will be described later.

In the description below, an arbitrary operation button among the operation buttons (108a to 108c) is referred to as an "operation button 108", and an arbitrary connection port among the connection ports (1132a to 1132c) is referred to as a "connection port 1132".

The arm 1200 is attached to the housing 1100 via a torque hinge 1210. The arm 1200 is attached in a rotatable manner within a range of a tilt angle $\theta_1$ of 135 degrees in the vertical direction with respect to the housing 1100. FIG. 2 illustrates a state where the tilt angle $\theta_1$ is 90 degrees.

The camera housing 1300 is provided with a built-in camera 1021 (corresponding a camera 112 described later), and can capture a user, a document, and a room, for example. The camera housing 1300 is further provided with a torque hinge 1310 and is attached to the arm 1200 via the torque hinge 1310. The camera housing 1300 is attached to the arm 1200 via the torque hinge 1310 in a rotatable manner within a range of a pan angle $\theta_2$ of ±180 degrees in the horizontal direction and within a range of a tilt angle $\theta_3$ of ±45 degrees in the vertical direction with respect to the arm 1200 defining the state illustrated in FIG. 2 as 0 degrees.

Because the appearances of the user PC 20, the relay apparatus 30, the transmission management system 50, the transmission terminal management system 80, the program providing system 90, and the maintenance system 100 are the same as that of a typical server computer, the explanations thereof will be omitted.

Figure 3:
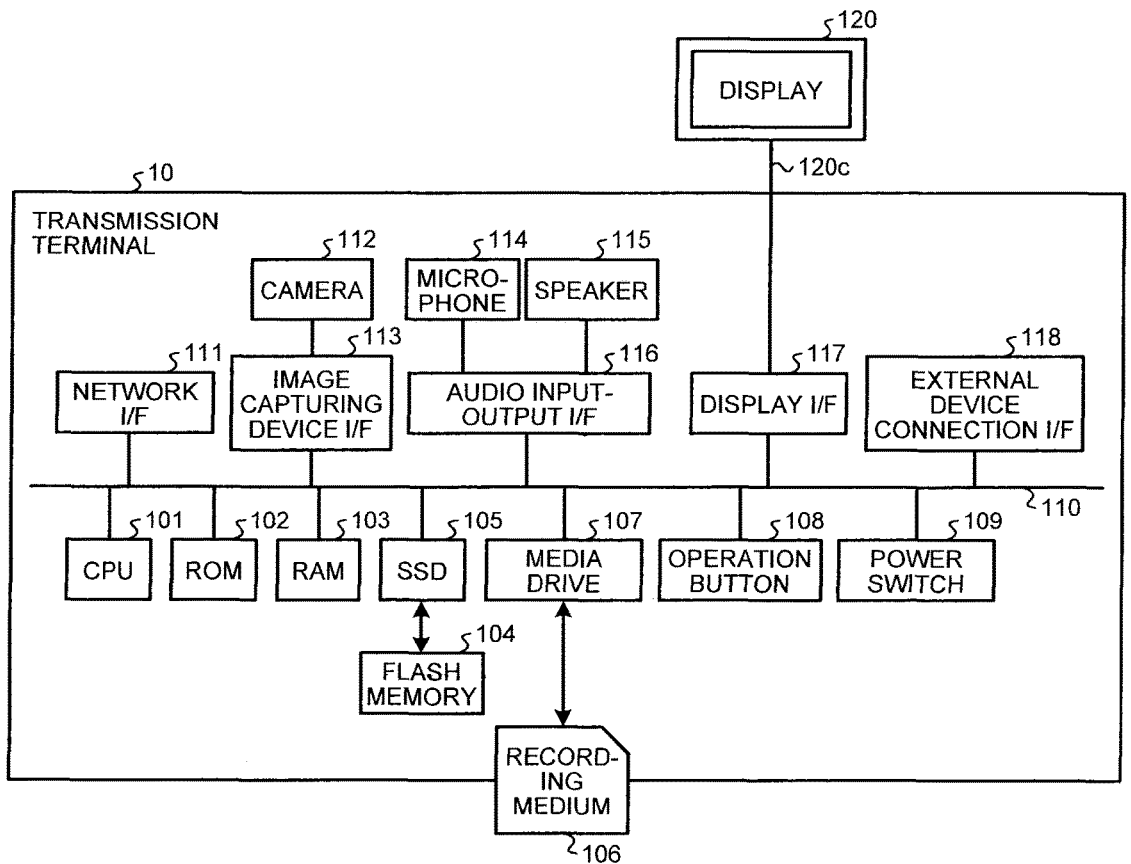
FIG. 3 is a diagram of a hardware configuration of the transmission terminal.

FIG. 3 is a diagram of a hardware configuration of the transmission terminal 10. As illustrated in FIG. 3, the transmission terminal 10 includes a central processing unit (CPU) 101 that collectively controls operations of the transmission terminal 10, a read-only memory (ROM) 102 storing therein a computer program, such as an initial program loader (IPL), used for driving the CPU 101, a random access memory (RAM) 103 used as a work area for the CPU 101, a flash memory 104 that stores therein various types of data, such as a terminal program, image data, and audio data, a solid state drive (SSD) 105 that controls reading or writing various types of data from or to the flash memory 104 under the control of the CPU 101, a media drive 107 that controls reading or writing (storing) data from or to a recording medium 106, such as a flash memory, the operation button 108 operated to select a destination of the transmission terminal 10, for example, the power switch 109 used for switching on/off the power of the transmission terminal 10, and a network interface (I/F) 111 that transmits data using the communication network 2.

The transmission terminal 10 further includes the built-in camera 112 that captures a subject to acquire image data under the control of the CPU 101, an image capturing device I/F 113 that controls driving of the camera 112, the built-in microphone 114 that receives audio, the built-in speaker 115 that outputs audio, an audio input-output I/F 116 that performs input and output processing of an audio signal between the microphone 114 and the speaker 115 under the control of the CPU 101, a display I/F 117 that transmits image data to the external display 120 under the control of the CPU 101, the external device connection I/F 118 that is attached to a connection port 1132 illustrated in FIG. 2 and to which various types of external devices are connected, the alarm lamp 119 that announces an error in various types of functions of the transmission terminal 10, and a bus line 110, such as an address bus and a data bus, that electrically connects these components as illustrated in FIG. 3.

The display 120 is a display unit that is formed of a liquid crystal or an organic electroluminescence (EL) and that displays an image of the subject and an operation icon, for example. The display 120 is connected to the display I/F 117 via the cable 120c. The cable 120c may be a cable for an analog RGB (VGA) signal, a cable for a component video, or a cable for a high-definition multimedia interface (HDMI) signal or a digital video interactive (DVI) signal.

The camera 112 includes a lens and a solid-state image capturing device that converts light into an electric charge to computerize an image (video) of the subject. Examples of the solid-state image capturing device include a complementary metal oxide semiconductor (CMOS) and a charge coupled device (CCD).

An external device, such as an external camera, an external microphone, and an external speaker, can be connected to the external device connection I/F 118 with a universal serial bus (USB) cable, for example. If an external camera is connected, the external camera is driven prior to the built-in camera 112 under the control of the CPU 101. Similarly, if an external microphone or an external speaker is connected, the external microphone or the external speaker is driven prior to the built-in microphone 114 or the built-in speaker 115, respectively, under the control of the CPU 101.

The recording medium 106 is attachable and detachable to and from the transmission terminal 10. Any type of memory may be used as the flash memory 104 as long as the memory is a non-volatile memory from or to which data is read or written under the control of the CPU 101, and an electrically erasable and programmable ROM (EEPROM) may be used, for example.

The terminal program described above may be distributed in a manner recorded in a computer-readable recording medium, such as the recording medium 106, as a file in an installable or executable format. Furthermore, the terminal program described above may be stored in the ROM 102 instead of the flash memory 104.

Figure 4:
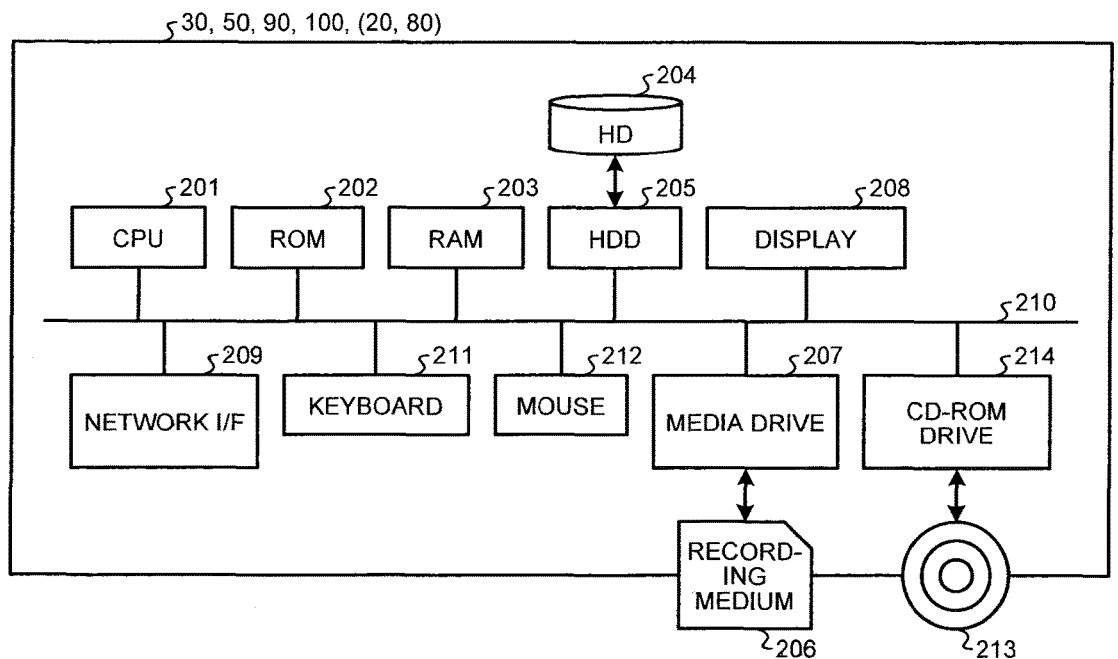
FIG. 4 is a diagram of a hardware configuration of a transmission management system.

FIG. 4 is a diagram of a hardware configuration of the transmission management system 50. The transmission management system 50 includes a CPU 201 that collectively controls operations of the transmission management system 50, a ROM 202 storing therein a computer program, such as an IPL, used for driving the CPU 201, a RAM 203 used as a work area for the CPU 201, the HD 204 that stores therein various types of data, such as a transmission management program, a hard disk drive (HDD) 205 that controls reading or writing various types of data from or to the HD 204 under the control of the CPU 201, a media drive 207 that controls reading or writing (storing) data from or to a recording medium 206, such as a flash memory, a display 208 that displays various types of information, such as a cursor, a menu, a window, a character, and an image, a network I/F 209 that transmits data using the communication network 2, a keyboard 211 provided with a plurality of keys used for inputting a character, a value, and various types of instructions, for example, a mouse 212 that selects and performs the various types of instructions, selects a target to be processed, and moves the cursor, a compact disc read-only memory (CD-ROM) drive 214 that controls reading or writing various types of data from or to a CD-ROM 213 serving as an example of a detachable recording medium, and a bus line 210, such as an address bus and a data bus, that electrically connects these components as illustrated in FIG. 4.

The transmission management program described above may be distributed in a manner recorded in a computer-readable recording medium, such as the recording medium 206 and the CD-ROM 213, as a file in an installable or executable format. Furthermore, the transmission management program described above may be stored in the ROM 202 instead of the HD 204.

Because the user PC 20 has a hardware configuration similar to that of the transmission management system 50, the explanation thereof will be omitted. Furthermore, because the relay apparatus 30, the transmission terminal management system 80, the program providing system 90, and the maintenance system 100 each have a hardware configuration similar to that of the transmission management system 50, the explanations thereof will be omitted. Each of the HDs 204 of the user PC 20, the relay apparatus 30, the transmission terminal management system 80, the program providing system 90, and the maintenance system 100 stores therein a computer program for controlling each apparatus and system.

Also in this case, the computer program may be distributed in a manner recorded in a computer-readable recording medium, such as the recording medium 206 and the CD-ROM 213, as a file in an installable or executable format. Furthermore, the computer program described above may be stored in the ROM 202 instead of the HD 204.

The computer program described above may be provided in a manner recorded in a computer-readable recording medium, such as a compact disc recordable (CD-R), a digital versatile disk (DVD), and a Blu-ray disk, which are other examples of the detachable recording medium described above.

Figure 5:
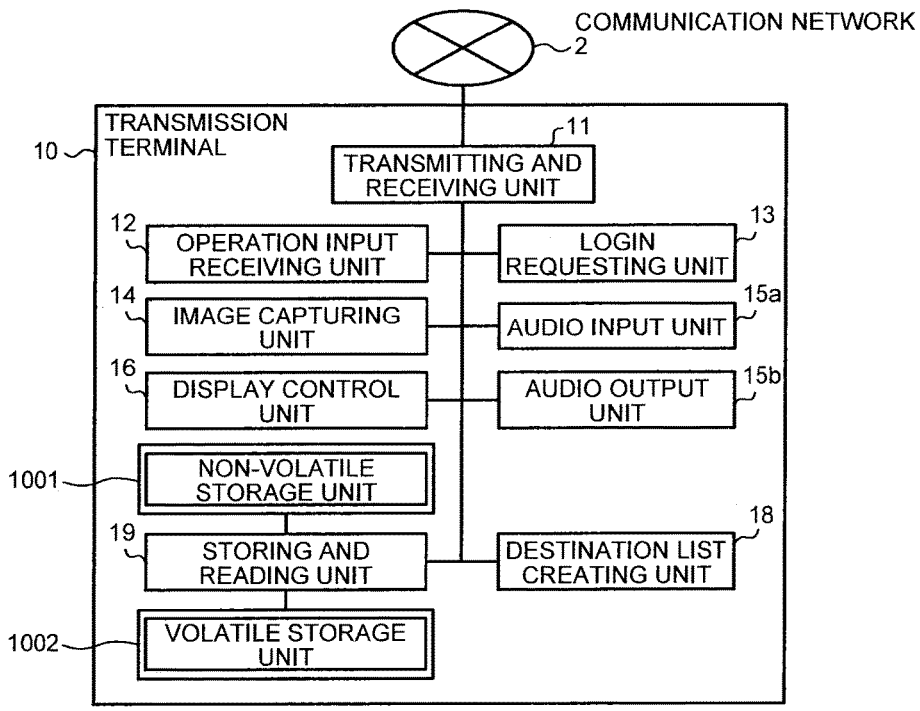
FIG. 5 is a diagram of a functional configuration of the transmission terminal.

A functional configuration of the transmission system 1 according to the present embodiment will now be described. FIG. 5 is a diagram of the functional configuration of the transmission terminal 10. The transmission terminal 10 includes a transmitting and receiving unit 11, an operation input receiving unit 12, a login requesting unit 13, an image capturing unit 14, an audio input unit 15*a*, an audio output unit 15*b*, a display control unit 16, a destination list creating unit 18, and a storing and reading unit 19. Each of the units is a function realized by or a unit caused to function by any of the components illustrated in FIG. 3 operating in response to an instruction issued from the CPU 101 in accordance with the terminal program loaded on the RAM 103 from the flash memory 104.

The transmission terminal 10 further includes a volatile storage unit 1002 established by the RAM 103 illustrated in FIG. 3 and a non-volatile storage unit 1001 established by the flash memory 104 illustrated in FIG. 3.

The functional configuration of the transmission terminal 10 will now be described in detail with reference to FIG. 3 and FIG. 5. To describe functional configuration units of the transmission terminal 10 below, an explanation will be made of the relationship between main components for realizing the functional configuration units of the transmission terminal 10 among the components illustrated in FIG. 3 and the functional configuration units.

The transmitting and receiving unit 11 of the transmission terminal 10 illustrated in FIG. 5 is realized by an instruction issued from the CPU 101 illustrated in FIG. 3 and the network I/F 111 illustrated in FIG. 3. The transmitting and receiving unit 11 transmits and receives various types of data to and from other terminals, apparatuses, or systems via the communication network 2. Before starting a call with a desired destination terminal, the transmitting and receiving unit 11 starts to receive operating status information indicating the operating status of each terminal serving as a destination candidate from the transmission management system 50.

Besides the operating status of the transmission terminal 10 (whether the transmission terminal 10 is on line or off line), the operating status information indicates more detailed statuses, such as whether the transmission terminal 10 is busy or whether the user is not at his/her desk in the on-line status. Furthermore, besides the operating status of the transmission terminal 10, the operating status information indicates various statuses, such as a status in which the cable 120*c* comes off the transmission terminal 10, a status in which not an image but audio is output, and a status in which audio is prevented from being output (MUTE).

The operation input receiving unit 12 is realized by an instruction issued from the CPU 101 illustrated in FIG. 3 and by the operation button 108 and the power switch 109 illustrated in FIG. 3 and receives various types of inputs performed by the user. If the user turns on the power switch 109 illustrated in FIG. 3, for example, the operation input receiving unit 12 illustrated in FIG. 5 receives the power-on to turn on the power.

The login requesting unit 13 is realized by an instruction issued from the CPU 101 illustrated in FIG. 3. The login requesting unit 13 uses the reception of power-on as a trigger to automatically transmit login request information for requesting login and a current IP address of a requestor terminal from the transmitting and receiving unit 11 to the transmission management system 50 via the communication network 2. If the user turns off the power switch 109 from the on state, the transmitting and receiving unit 11 transmits operating status information for turning off the power to the transmission management system 50, and the operation input receiving unit 12 then completely turns off the power. With this configuration, the transmission management system 50 can grasp the fact that the power is turned off from the on state in the transmission terminal 10.

The image capturing unit 14 is realized by an instruction issued from the CPU 101 illustrated in FIG. 3 and by the camera 112 and the image capturing device I/F 113 illustrated in FIG. 3. The image capturing unit 14 captures a subject and outputs image data obtained by the capturing.

The audio input unit 15a is realized by an instruction issued from the CPU 101 illustrated in FIG. 3 and the audio input-output I/F 116 illustrated in FIG. 3. After the microphone 114 converts audio of the user into an audio signal, the audio input unit 15a receives audio data related to the audio signal. The audio output unit 15b is realized by an instruction issued from the CPU 101 illustrated in FIG. 3 and the audio input-output I/F 116 illustrated in FIG. 3. The audio output unit 15b outputs the audio signal related to the audio data to the speaker and causes the speaker 115 to output the audio.

The display control unit 16 is realized by an instruction issued from the CPU 101 illustrated in FIG. 3 and the display I/F 117 illustrated in FIG. 3 and performs control for transmitting image data to the external display 120.

The destination list creating unit 18 creates and updates a destination list in which the status of a destination candidate is represented by an icon as illustrated in FIG. 13 based on destination list information, which will be described later, and the operating status information of the transmission terminal 10 serving as the destination candidate received from the transmission management system 50.

The storing and reading unit 19 is realized by an instruction issued from the CPU 101 illustrated in FIG. 3 and the SSD 105 illustrated in FIG. 3. The storing and reading unit 19 stores various types of data in the non-volatile storage unit 1001 and reads the various types of data stored in the non-volatile storage unit 1001. The non-volatile storage unit 1001 stores therein a terminal identification (ID) serving as an example of identification information for identifying the transmission terminal 10 and a password, for example. Furthermore, the storing and reading unit 19 stores various types of data in the volatile storage unit 1002 and reads the various types of data stored in the volatile storage unit 1002.

In the volatile storage unit 1002, image data and audio data received in a call with a destination terminal are overwritten every time image data and audio data are received. The display 120 displays an image using the image data yet to be overwritten, and the speaker 115 outputs audio using the audio data yet to be overwritten.

The terminal ID and a group ID for identifying a group, which will be described later, according to the present embodiment indicate identification information, such as a language, a character, a symbol, and various types of marks, used for uniquely identifying the transmission terminal 10 and the relay apparatus 30, respectively. Furthermore, the terminal ID and the group ID may be identification information obtained by combining at least two of the language, the character, the symbol, and the various types of marks described above.

Figure 6:
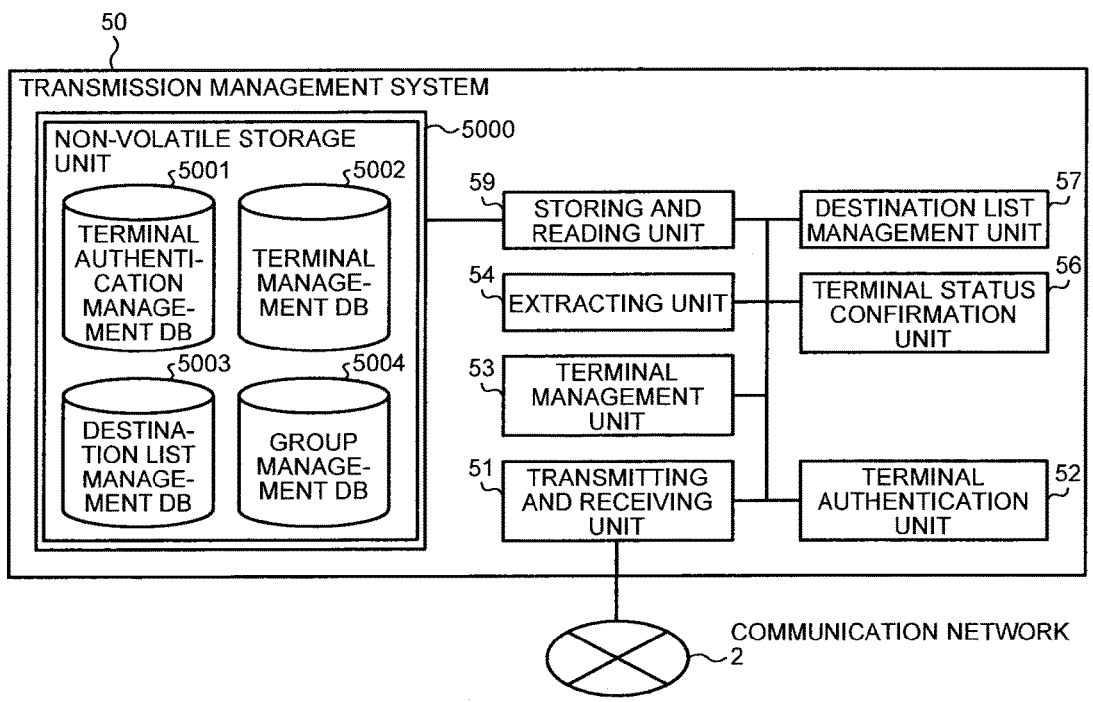
FIG. 6 is a diagram of a functional configuration of the transmission management system.

FIG. 6 is a diagram of a functional configuration of the transmission management system 50. The transmission management system 50 includes a transmitting and receiving unit 51, a terminal authentication unit 52, a terminal management unit 53, an extracting unit 54, a terminal status confirmation unit 56, a destination list management unit 57, and a storing and reading unit 59. Each of the units is a function realized by or a unit caused to function by any of the components illustrated in FIG. 4 operating in response to an instruction issued from the CPU 201 in accordance with a management system program loaded on the RAM 203 from the HD 204.

The transmission management system 50 further includes a non-volatile storage unit 5000 that retains memory of various types of data even if the power of the transmission management system 50 is turned off, and the non-volatile storage unit 5000 is established by the HD 204 illustrated in FIG. 4. Furthermore, the non-volatile storage unit 5000 stores therein data of a destination list frame illustrated in FIG. 13 (that is data of the destination list frame illustrated in FIG. 13 and includes no icon indicating a specific operating statues, no terminal ID, or no terminal name).

The non-volatile storage unit 5000 includes a terminal authentication management database (DB) 5001, a terminal management DB 5002, a destination list management DB 5003, and a group management DB 5004.

The terminal authentication management DB 5001 has a terminal authentication management table illustrated in FIG. 7. In the terminal authentication management table, a password of each transmission terminal 10 is managed in association with each terminal ID of all the transmission terminals 10 managed by the transmission management system 50. The terminal authentication management table illustrated in FIG. 7 stores therein the fact that the terminal ID of the transmission terminal 10aa is "10aa" and that the password thereof is "aaaa", for example.

The terminal management DB 5002 has a terminal management table illustrated in FIG. 8. In the terminal management table, a located position of the transmission terminal 10, an operating status of the transmission terminal 10, a reception date and time when the transmission management system 50 receives login request information, and an IP address of the transmission terminal 10 are managed in association with the terminal ID of the transmission terminal 10. The terminal management table illustrated in FIG. 8 stores therein the fact that the located position of the transmission terminal 10aa with the terminal ID "10aa" is "Japan Tokyo Office AA terminal", that the operating status thereof is "on-line (capable of transmitting)", that the reception date and time of login request information thereof is "13:40 p.m. on Nov. 10, 2009", and that the IP address of the transmission terminal 10aa is "1.2.1.3", for example.

The destination list management DB 5003 has a destination list management table illustrated in FIG. 9. In the destination list management table, a terminal ID of a destination terminal registered as a destination terminal candidate and a terminal name of the destination terminal are managed in association with a terminal ID of a requester terminal that requests to start a call in a video conference.

The destination list management table illustrated in FIG. 9 stores therein the fact that destination terminal candidates with which the requestor terminal (transmission terminal 10aa) with the terminal ID "10aa" can request to start a call in a video conference are the transmission terminal 10ab with the terminal ID "10ab", the transmission terminal 10ac with the terminal ID "10ac", the transmission terminal 10ad with the terminal ID "10ad", and the transmission terminal 10ae with the terminal ID "10ae".

The terminal name (destination name) of the destination terminal is information displayed on the display 120 of the requestor terminal as a name of the destination terminal in the destination list, which will be described later. In the destination list management table, a desired name can be registered as a destination name of a certain destination terminal for each requestor terminal. In the example of FIG. 9, for example, the requestor terminal with the terminal ID "10aa" registers a name of "Japan Tokyo Office, terminal AC" for a destination terminal with the terminal ID "10ac". By contrast, the requestor terminal with the terminal ID "10ab" registers a name of "Japan Tokyo Office, terminal C" for the destination terminal with the terminal ID "10ac". Thus, a destination terminal identified by the same terminal ID can be displayed on the display 120 in a different destination name for each requestor terminal.

In the transmission system 1 according to the present embodiment, the destination name can be arbitrarily set or changed by the user of the requestor terminal, for example. Furthermore, for example, it may be desired to collectively change a destination name of a destination terminal in all the transmission terminals (requestor terminals) located in a certain office. The transmission system 1 according to the present embodiment can register transmission terminals to be targets of such collective change in the same group and collectively change a destination name in a group unit. The processing for changing a destination name will be described later in detail.

The group management DB 5004 has a group management table illustrated in FIG. 10. In the group management table, a group name, a password, and terminal IDs (belonging terminal IDs) of transmission terminals belonging to a group are managed in association with a group ID identifying the group composed of the transmission terminals to be targets of the collective change of a destination name described above. The group management table illustrated in FIG. 10 stores therein the fact that the group name of a group ID "g001" is "T Corporation Japan Tokyo Office", that the password thereof is "ggg", and the terminal IDs of the transmission terminals 10 belonging to the group are "10aa, 10ab, 10ac, 10ad, and 10ae", for example.

The group ID, the terminal ID, and the display information are associated with one another by the destination list management table and the group management table. In other words, the destination list management table and the group management table function as a display information storage unit.

Referring back to FIG. 6, the functional configuration of the transmission management system 50 will now be described in detail. To describe functional configuration units of the transmission management system 50 illustrated in FIG. 6, an explanation will be made of the relationship between main components for realizing the functional configuration units of the transmission management system 50 among the components illustrated in FIG. 4 and the functional configuration units.

The transmitting and receiving unit 51 is realized by an instruction issued from the CPU 201 illustrated in FIG. 4 and the network I/F 209 illustrated in FIG. 4. The transmitting and receiving unit 51 transmits and receives various types of data to and from other terminals, apparatuses, or systems via the communication network 2.

The terminal authentication unit 52 is realized by an instruction issued from the CPU 201 illustrated in FIG. 4. The terminal authentication unit 52 uses a terminal ID and a password included in login request information received by the transmitting and receiving unit 51 as a search key to search the terminal authentication management DB 5001 in the non-volatile storage unit 5000. The terminal authentication unit 52 then determines whether the same pair of a terminal ID and a password is managed in the terminal authentication management DB 5001, thereby performing terminal authentication.

The terminal management unit 53 is realized by an instruction issued from the CPU 201 illustrated in FIG. 4. To manage the operating status of a requestor terminal that makes a login request, the terminal management unit 53 stores and manages the terminal ID of the requestor terminal, the located position of the terminal, the operating status of the requestor terminal, the reception date and time when the transmission management system 50 receives the login request information, and the IP address of the requestor terminal in the terminal management DB 5002 (refer to FIG. 8) in association with one another. Furthermore, the terminal management unit 53 changes the operating status indicating on-line to off-line in the terminal management DB 5002 (refer to FIG. 8) based on operating status information for turning off the power transmitted from the transmission terminal 10.

The extracting unit 54 is realized by an instruction issued from the CPU 201 illustrated in FIG. 4. The extracting unit 54 searches the destination list management DB 5003 (refer to FIG. 9) using the terminal ID of the requestor terminal that makes the login request as a key to read a terminal ID of a destination terminal candidate that can establish a call with the requestor terminal, thereby extracting a destination terminal ID. Furthermore, the extracting unit 54 searches the destination list management DB 5003 (refer to FIG. 9) using the terminal ID of the requestor terminal that makes the login request as a key to extract a terminal ID of another requestor terminal that registers the terminal ID of the requestor terminal as a destination terminal candidate.

The extracting unit 54 searches the terminal management DB 5002 (refer to FIG. 8) using the terminal ID of the destination terminal candidate extracted by the extracting unit 54 as a search key to read the operating status for each terminal ID extracted by the extracting unit 54. Thus, the extracting unit 54 can acquire the operating status of the destination terminal candidate that can establish a call with the requestor terminal that makes the login request. Furthermore, the extracting unit 54 searches the terminal management DB 5002 (refer to FIG. 8) using the terminal ID extracted by the extracting unit 54 as a search key to extract the operating status of the requestor terminal that makes the login request.

The terminal status confirmation unit 56 is realized by an instruction issued from the CPU 201 illustrated in FIG. 4. The terminal status confirmation unit 56 searches the terminal management DB 5002 (refer to FIG. 8) using a terminal ID or a destination name as a search key, thereby confirming the operating status corresponding thereto.

The destination list management unit 57 is realized by an instruction issued from the CPU 201 illustrated in FIG. 4 and adds or deletes, that is, updates a terminal ID of a destination terminal for each terminal ID of the requestor terminals in the destination list management DB 5003 (refer to FIG. 9).

The storing and reading unit 59 is realized by an instruction issued from the CPU 201 illustrated in FIG. 4 and the HDD 205 illustrated in FIG. 4. The storing and reading unit 59 stores various types of data in the non-volatile storage unit 5000 and reads the various types of data stored in the non-volatile storage unit 5000.

Figure 11:
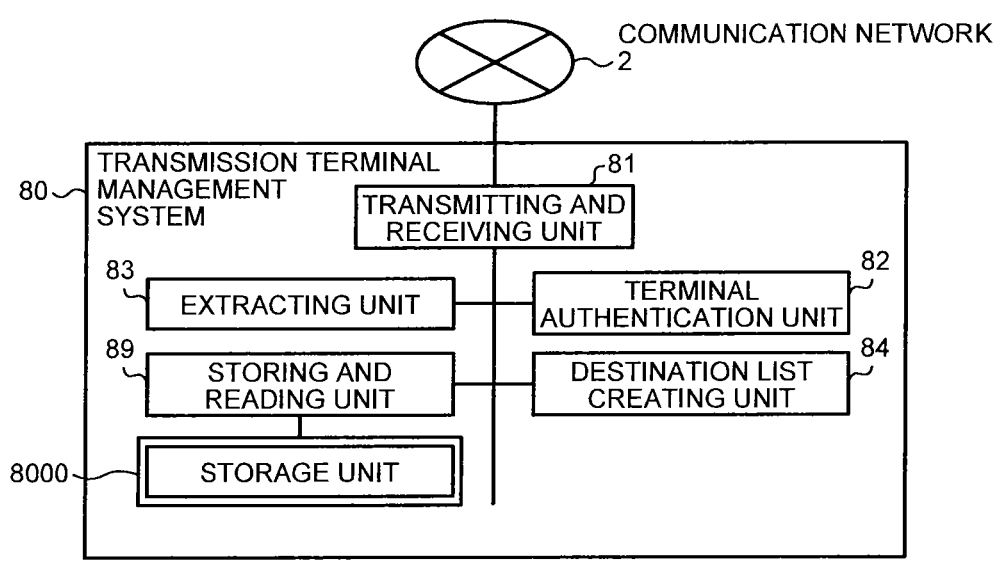
FIG. 11 is a diagram of a functional configuration of a transmission terminal management system.

FIG. 11 is a diagram of a functional configuration of the transmission terminal management system 80. The transmission terminal management system 80 includes a transmitting and receiving unit 81, a terminal authentication unit 82, an extracting unit 83, and a destination list creating unit 84. Each of the units is a function realized by or a unit caused to function by any of the components illustrated in FIG. 4 operating in response to an instruction issued from the CPU 201 in accordance with a transmission terminal management system program loaded on the RAM 203 from the HD 204. The transmission terminal management system 80 further includes a storage unit 8000 established by the RAM 203 or the HD 204 illustrated in FIG. 4 and a storing and reading unit 89 that writes data to the storage unit 8000 and reads data from the storage unit 8000.

To describe functional configuration units of the transmission terminal management system 80 below, an explanation will be made of the relationship between main components for realizing the functional configuration units of the transmission terminal management system 80 among the components illustrated in FIG. 4 and the functional configuration units.

The transmitting and receiving unit 81 is realized by an instruction issued from the CPU 201 illustrated in FIG. 4 and the network I/F 209 illustrated in FIG. 4. The transmitting and receiving unit 81 transmits and receives various types of data (or information) to and from other terminals, apparatuses, or systems via the communication network 2. Furthermore, the transmitting and receiving unit 81 has a Web server function and a data processing function, which will be described later.

The terminal authentication unit 82 is realized by an instruction issued from the CPU 201 illustrated in FIG. 4. The terminal authentication unit 82 accesses the transmission management system 50 to search the terminal authentication management DB 5001 (refer to FIG. 7) established in the non-volatile storage unit 5000. The terminal authentication unit 82 then determines whether the same pair of a terminal ID and a password as the terminal ID and the password of the requestor terminal is managed, thereby determining whether the transmission terminal 10 of the user of the user PC 20 is a valid terminal in the video conference system.

Furthermore, the terminal authentication unit 82 accesses the transmission management system 50 to search the group management DB 5004 (refer to FIG. 10). The terminal authentication unit 82 then determines whether the same pair of a group ID and a password as the group ID and the password received from the user is managed, thereby determining whether the transmission terminal 10 of the user of the user PC 20 is a valid terminal belonging to a certain group.

The extracting unit 83 is realized by an instruction issued from the CPU 201 illustrated in FIG. 4. The extracting unit 83 uses the terminal ID of the requestor terminal as a search key to extract a terminal ID of a destination terminal corresponding thereto from the destination list management DB 5003 (refer to FIG. 9) established in the non-volatile storage unit 5000 of the transmission management system 50. In other words, the extracting unit 83 extracts a terminal ID of a destination terminal corresponding to a certain requestor terminal.

Figures 14, 15:
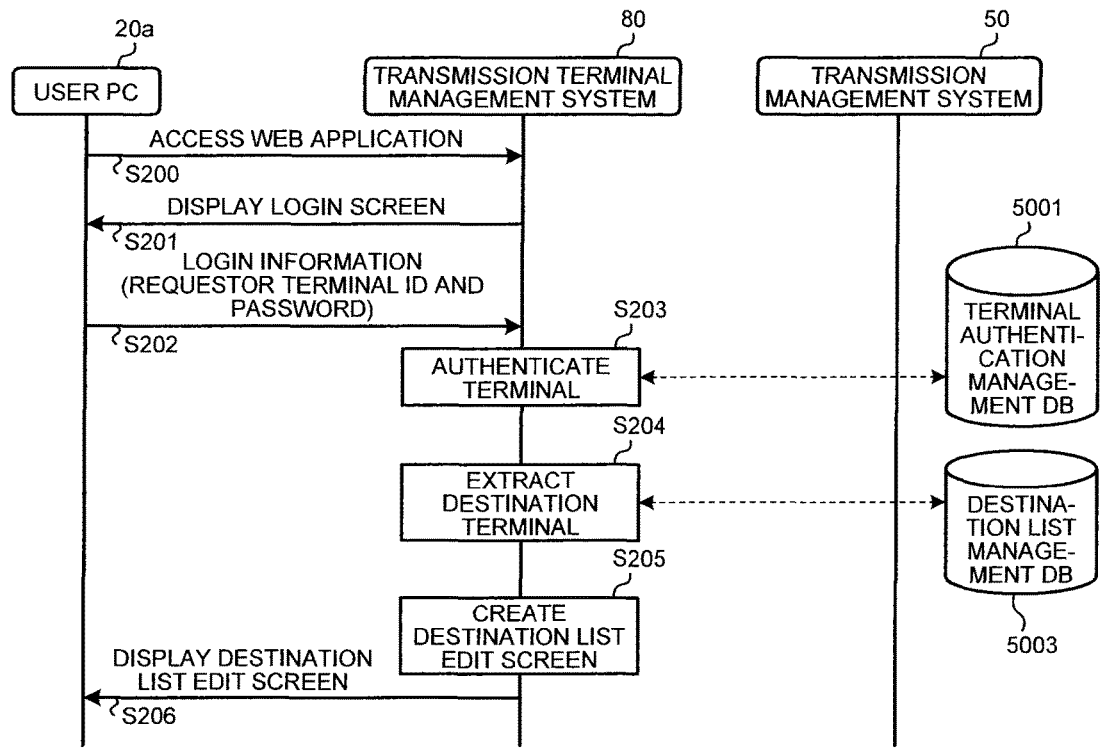
FIG. 14 is a sequence diagram of processing for displaying a destination list edit screen.
FIG. 15 is a conceptual diagram of the destination list edit screen.

The destination list creating unit 84 is realized by an instruction issued from the CPU 201 illustrated in FIG. 4 and creates a HyperText Markup Language (HTML) of a destination list edit screen illustrated in FIG. 15. The destination list edit screen is a screen that receives user operations such as editing of a destination terminal registered for a certain requestor terminal.

Figure 12:
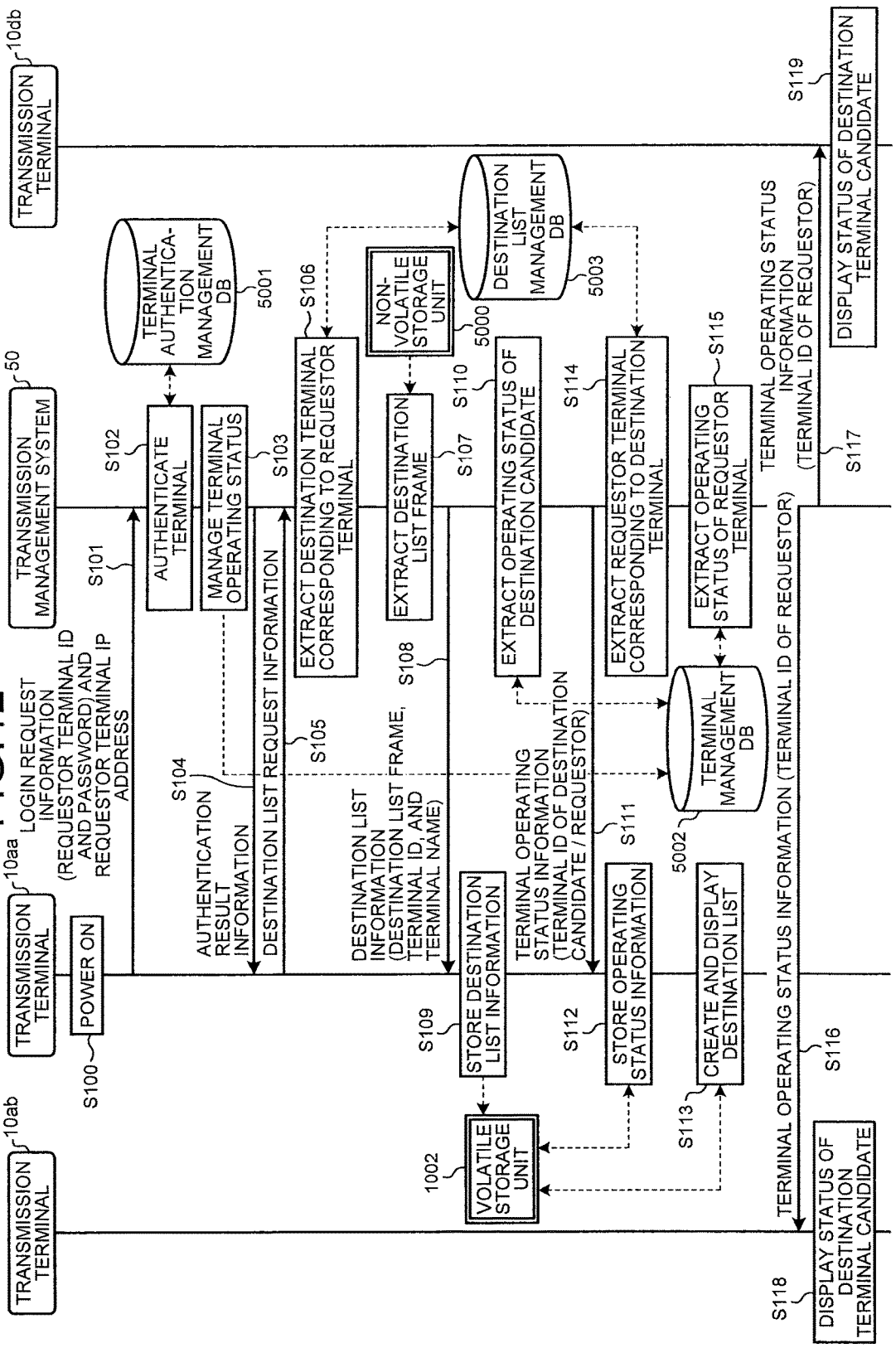
FIG. 12 is a sequence diagram of processing in a preparatory stage for starting a call between the transmission terminals.

An explanation will be made of transmission and reception processing of management information in a preparatory stage before a call is started between the transmission terminal 10aa and a transmission terminal 10db with reference to FIG. 12. FIG. 12 is a sequence diagram of the processing in the preparatory stage for starting a call between the transmission terminals. FIG. 13 is a conceptual diagram of a destination list screen.

If the user turns on the power switch 109 illustrated in FIG. 3, the operation input receiving unit 12 illustrated in FIG. 5 receives the power-on to turn on the power (Step S100). The login requesting unit 13 uses the reception of power-on as a trigger to automatically transmit login request information for requesting login from the transmitting and receiving unit 11 to the transmission management system 50 via the communication network 2 (Step S101).

The login request information includes the terminal ID and the password for identifying the transmission terminal 10aa serving as the terminal of a requestor. The terminal ID and the password are data read from the non-volatile storage unit 1001 via the storing and reading unit 19 and transmitted to the transmitting and receiving unit 11. If the login request information is transmitted from the transmission terminal 10aa to the transmission management system 50, the transmission management system 50 serving as a receiver can grasp the IP address of the transmission terminal 10aa serving as a transmitter.

The terminal authentication unit 52 of the transmission management system 50 uses the terminal ID and the password included in the login request information received by the transmitting and receiving unit 51 as a search key to search the terminal authentication management DB 5001 (refer to FIG. 7) in the non-volatile storage unit 5000. The terminal authentication unit 52 then determines whether the same terminal ID and the same password are managed in the terminal authentication management DB 5001, thereby performing terminal authentication (Step S102).

If the terminal authentication unit 52 determines that the same terminal ID and the same password are managed and that the login request is made by an authorized transmission terminal 10, the terminal management unit 53 stores the operating status, the reception date and time when the login request information is received, and the IP address of the transmission terminal 10aa in the terminal management DB 5002 (refer to FIG. 8) in association with each record of the terminal ID of the transmission terminal 10aa (Step S103).

As a result, as illustrated in FIG. 8, the terminal management unit 53 stores to manage the operating status "on-line", the reception date and time "2009.11.10.13:40", and the IP address "1.2.1.3" in the terminal management table in association with the terminal ID "10aa", for example.

The transmitting and receiving unit 51 of the transmission management system 50 then transmits authentication result information indicating authentication results acquired by the terminal authentication unit 52 to the requestor terminal (transmission terminal 10aa) that makes the login request via the communication network 2 (Step S104). In the present embodiment, an assumption is made that the transmission terminal 10aa is determined to be an authorized terminal by the terminal authentication unit 52, and the explanation will be continued.

If the requestor terminal (transmission terminal 10aa) receives the authentication result information indicating that the transmission terminal 10aa is determined to be an authorized terminal, the transmitting and receiving unit 11 transmits destination list request information for requesting a destination list to the transmission management system 50 via the communication network 2 (Step S105). As a result, the transmitting and receiving unit 51 of the transmission management system 50 receives the destination list request information.

The extracting unit 54 uses the terminal ID "10aa" of the requestor terminal (transmission terminal 10aa) that makes the login request as a search key to search the destination list management DB 5003 (refer to FIG. 9). The extracting unit 54 then reads and extracts a terminal ID of a destination terminal candidate that can establish a call with the requestor terminal (transmission terminal 10aa) and a destination name corresponding to the terminal ID (Step S106).

In the present embodiment, the extracting unit 54 extracts terminal IDs ("10ab", "10ac", "10ad", and "10ae") of destination terminals (10ab, 10ac, 10ad, and 10ae) corresponding to the terminal ID "10aa" of the requestor terminal (transmission terminal 10aa) and terminal names ("Japan Tokyo Office, terminal AB", "Japan Tokyo Office, terminal AC", "Japan Tokyo Office, terminal AD", and "Japan Tokyo Office, terminal AE") corresponding thereto, respectively.

Subsequently, the transmitting and receiving unit 51 of the transmission management system 50 reads data of the destination list frame from the non-volatile storage unit 5000 by the storing and reading unit 59 (Step S107) and transmits "destination list information (the destination list frame, the terminal ID of the destination terminal, and the terminal name of the destination terminal)" including the destination list frame and the terminal ID and the terminal name of the destination terminal extracted by the extracting unit 54 to the requestor terminal (transmission terminal 10aa) (Step S108). As a result, the transmitting and receiving unit 11 receives the destination list information, and the storing and reading unit 19 stores the destination list information in the volatile storage unit 1002 in the requestor terminal (transmission terminal 10aa) (Step S109).

As described above, in the present embodiment, not each of the transmission terminals 10 manages the destination list information, but the transmission management system 50 collectively manages the destination list information of all the terminals. Therefore, even if a new transmission terminal 10 is included in the transmission system 1, if the transmission terminal 10 already included is replaced by a new model of the transmission terminal 10, or if the appearance of the destination list frame is changed, for example, it is possible to save the trouble of changing the destination list information in the transmission terminal 10 because the transmission management system 50 collectively deals with such changes.

The extracting unit 54 of the transmission management system 50 uses the terminal IDs ("10ab", "10ac", "10ad", and "10ae") of the destination terminal candidates extracted by the extracting unit 54 as a search key to search the terminal management DB 5002 (refer to FIG. 9) and reads the operating status corresponding to each terminal ID extracted by the extracting unit 54. Thus, the extracting unit 54 acquires the operating statuses of the terminals ("10ab", "10ac", "10ad", and "10ae") serving as the destination candidates (Step S110).

The transmitting and receiving unit 51 transmits "terminal operating status information" including the terminal ID "10ab", which is the search key used at Step S106, and an operating status "on-line (capable of establishing a call)" of the destination terminal (transmission terminal 10ab) corresponding thereto to the requestor terminal (transmission terminal 10aa) via the communication network 2 (Step S111). As part of processing at Step S111, the transmitting and receiving unit 51 also transmits the "terminal operating status information" of the other terminals, such as the "terminal operating status information" including the terminal ID "10ac" and an operating status "on-line (temporarily being interrupted)" of the destination terminal (transmission terminal 10ac) corresponding thereto, individually to the requestor terminal (transmission terminal 10aa).

The storing and reading unit 19 of the requestor terminal (transmission terminal 10aa) sequentially stores the terminal operating status information received from the transmission management system 50 in the volatile storage unit 1002 (Step S112). Thus, by receiving the operating status information of each terminal, the requestor terminal (transmission terminal 10aa) can acquire the current operating status of the destination terminal candidate, such as the transmission terminal 10ab, that can establish a call with the requestor terminal (transmission terminal 10aa).

Based on the destination list information and the terminal operating status information stored in the volatile storage unit 1002, the destination list creating unit 18 of the requestor terminal (transmission terminal 10aa) creates a destination list reflecting the status of the transmission terminal 10 serving as the destination candidate, and the display control unit 16 displays a display list screen illustrated in FIG. 13 on the display 120 illustrated in FIG. 3 while controlling the timing to display the destination list (Step S113).

On the destination list screen illustrated in FIG. 13, icons representing the operating statuses of the terminals indicate "on-line (capable of transmitting)", "off-line", "on-line (capable of transmitting)", and "on-line (busy)" in descending order. In a video conference system as in the present embodiment, "capable of transmitting" means "capable of establishing a call".

The extracting unit 54 of the transmission management system 50 searches the destination list management DB 5003 (refer to FIG. 9) based on the terminal ID "10aa" of the requestor terminal (transmission terminal 10aa) that makes the login request, thereby extracting a terminal ID of another requestor terminal that registers the terminal ID "10aa" of the requestor terminal (transmission terminal 10aa) as a destination terminal candidate (Step S114). In the present embodiment, an explanation will be made of the case where the extracting unit 54 extracts "10ab", "10ba", and "10db" at Step S114.

The extracting unit 54 of the transmission management system 50 then searches the terminal management DB 5002 (refer to FIG. 8) based on the terminal ID "10aa" of the requestor terminal (transmission terminal 10aa) that makes the login request, thereby acquiring the operating status of the requestor terminal (transmission terminal 10aa) that makes the login request (Step S115).

The transmitting and receiving unit 51 transmits the "terminal operating status information" including the terminal ID "10aa" of the requestor terminal (transmission terminal 10aa) and the operating status "on-line" acquired at Step S115 to the transmission terminals (10ba and 10db) whose operating status is "on-line" in the terminal management DB 5002 (refer to FIG. 8) among the transmission terminals (10ab, 10ba, and 10db) corresponding to the terminal IDs ("10ab", "10ba", and "10db") extracted at Step S114 (Steps S116 and S117). If the transmission terminals (10ba and 10db) receive the terminal operating status information, the transmission terminals (10ba and 10db) display the operating status of the destination terminal candidate (Steps S118 and 119).

When the transmitting and receiving unit 51 transmits the terminal operating status information to the transmission terminals (10ba and 10db), the transmitting and receiving unit 51 refers to the IP addresses of the terminals managed in the terminal management table illustrated in FIG. 8 based on the terminal IDs ("10ba" and "10db"). As a result, the transmitting and receiving unit 51 can transmit the terminal ID "10aa" and the operating status "on-line" of the requestor terminal (transmission terminal 10aa) that makes the login request to the destination terminals (10db and 10ba) that can establish a call with the requestor terminal (transmission terminal 10aa) that makes the login request.

Also in another transmission terminal 10, if a user turns on the power switch 109 illustrated in FIG. 3 in the same manner as at Step S100, the operation input receiving unit 12 illustrated in FIG. 5 receives the power-on, and processing similar to that from Step S101 to S119 is performed. Therefore, the explanation thereof will be omitted.

FIG. 14 is a sequence diagram of processing for displaying the destination list edit screen of the requestor terminal (transmission terminal 10aa) on the display 208 of the user PC 20a in the transmission system 1. As illustrated in FIG. 14, the user a of the user PC 20a inputs an URL from a Web browser of the user PC 20a, whereby the user PC 20a accesses a Web application provided by the transmission terminal management system 80 (Step S200). As a result, the Web server function of the transmitting and receiving unit 81 of the transmission terminal management system 80 displays a login screen to the user PC 20a, thereby encouraging the user a to input the ID and the password of the requestor terminal (transmission terminal 10aa) (Step S201).

In response to this, if the user a inputs the terminal ID and the password of the requestor terminal (transmission terminal 10aa), the user PC 20a transmits login information including the terminal ID and the password of the requestor terminal to the transmission terminal management system 80 (Step S202).

The terminal authentication unit 82 of the transmission terminal management system 80 accesses the transmission management system 50 to search the terminal authentication management DB 5001 (refer to FIG. 7) established in the non-volatile storage unit 5000. The terminal authentication unit 82 then determines whether the same pair of a terminal ID and a password as the terminal ID and the password of the requestor terminal is managed, thereby determining whether the transmission terminal 10aa of the user a of the user PC 20a is a valid terminal in the video conference system (Step S203).

If the transmission terminal 10aa is determined to be a valid terminal in the authentication, the extracting unit 83 searches the destination list management DB 5003 (refer to FIG. 9) established in the non-volatile storage unit 5000 of the transmission management system 50 based on the terminal ID "10aa" of the requestor terminal, thereby extracting a terminal ID and a destination name of a destination terminal corresponding thereto (Step S204).

The destination list creating unit 84 creates an HTML of the destination list edit screen illustrated in FIG. 15 based on the terminal ID and the destination name thus extracted (Step S205). Subsequently, the Web server function of the transmitting and receiving unit 81 displays the destination list edit screen to the user PC 20a (Step S206). Thus, the processing for displaying the destination list edit screen is completed.

As illustrated in FIG. 15, the destination list edit screen displays a destination name of a destination terminal, a terminal ID of the destination terminal, and an operation area for editing the destination name of the destination terminal on the destination list and deleting the destination name and the terminal ID of the destination terminal from the destination list. By clicking on a link of "edit" for "Japan Tokyo Office, terminal AC", for example, an edit screen for the terminal name "Japan Tokyo Office, terminal AC" can be opened.

Figure 16:
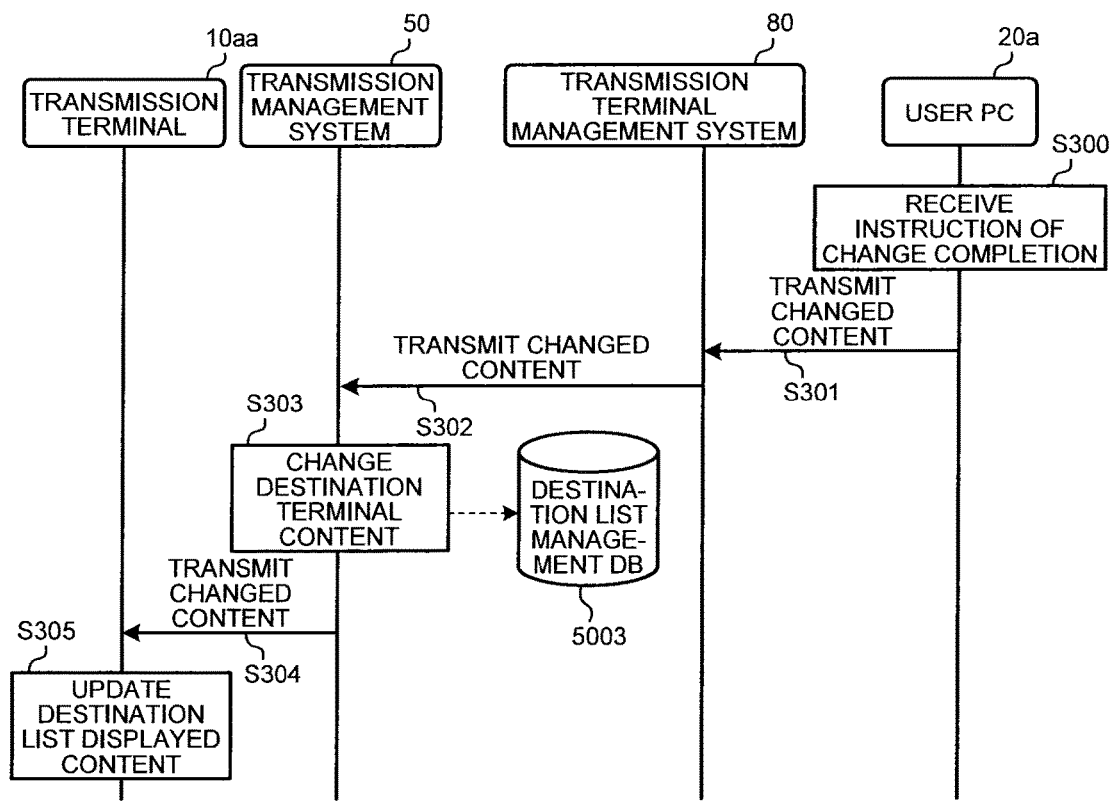
FIG. 16 is a sequence diagram of processing for editing a destination terminal in the transmission system.
Figure 17:
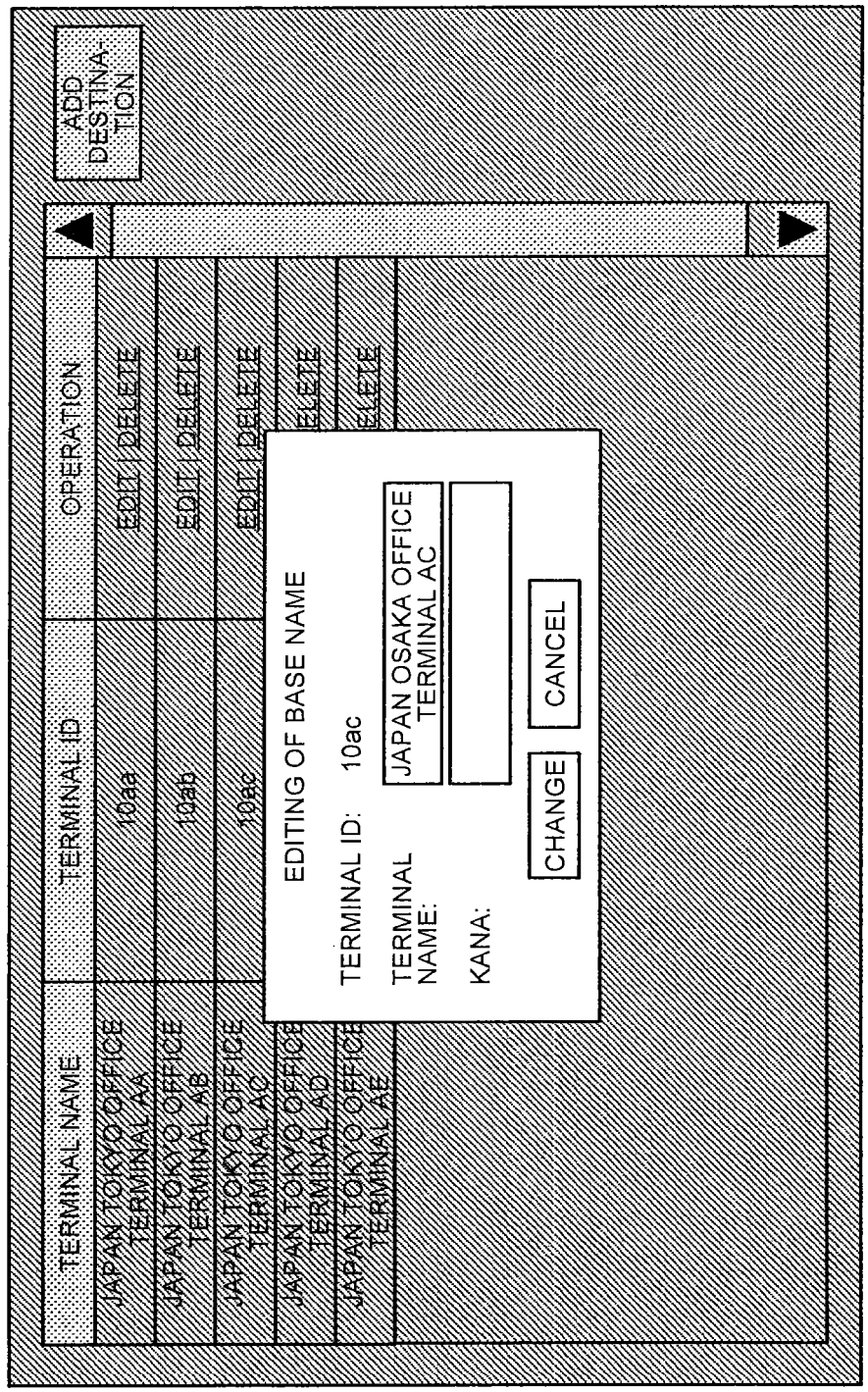
FIG. 17 is a conceptual diagram of an edit dialog.

FIG. 16 is a sequence diagram of processing for editing a destination terminal in the transmission system 1. In a state where the user PC 20a is displaying the destination list edit screen illustrated in FIG. 15, if a destination terminal to be a target of editing is selected by clicking on the link of "edit" for "Japan Tokyo Office, terminal AC" with a mouse, for example, an edit dialog illustrated in FIG. 17 is displayed on the destination list.

The user a can input a desired terminal name for the destination terminal on the edit dialog using a user interface, such as a keyboard, of the user PC 20a, for example. Furthermore, the user a can change "kava" of the terminal name, for example. If the input is completed, the user a clicks on a "change" button with the mouse. As a result, the user PC 20a receives an instruction of change completion (Step S300) and transmits the changed content to the transmission terminal management system 80 (Step S301). The changed content includes the terminal ID of the transmission terminal 10aa serving as the requestor terminal, the terminal ID of the destination terminal to be a target of the change, and the changed terminal name of the destination terminal. The changed content is further transmitted from the transmission terminal management system 80 to the transmission management system 50 (Step S302).

In the transmission management system 50, the destination list management unit 57 searches for the pair of the requestor terminal and the destination terminal related to the changed content from the destination list management DB 5003 to update the terminal name of the destination terminal corresponding thereto with the changed content (Step S303). At this time, if the power of the transmission terminal 10aa serving as the requestor terminal is turned on, the transmission management system 50 transmits the changed content, that is, the changed terminal name of the destination terminal to the transmission terminal 10aa (Step S304). As a result, display of the terminal name of the destination terminal in the destination list displayed on the display 120 of the transmission terminal 10aa is promptly updated (Step S305). Thus, the processing for editing the destination terminal is completed.

FIG. 18 is a view of the destination list management table updated with the changed content. As illustrated in FIG. 18, the terminal name of the destination terminal identified by the destination terminal ID "10ac" is changed from "Japan Tokyo Office, terminal AC" to "Japan Osaka Office, terminal AC". FIG. 19 is a view of the destination list screen displayed on the display 120 of the transmission terminal 10aa updated with the changed content. As illustrated in FIG. 19, also in the destination list screen displayed on the transmission terminal 10aa, the terminal name of the destination terminal identified by the terminal ID "10ac" is changed to "Japan Osaka Office, terminal AC".

As described above, in the transmission system 1 according to the present embodiment, the user PC 20a can update a content displayed on the transmission terminal 10 and promptly reflect a changed content in the user PC 20a on the content displayed on the transmission terminal 10. With this configuration, it is possible to prevent inconvenience in that the user fails to find a destination terminal to which the user wants to make a call on the destination list because, despite a change in a department name, the department name remains an old one without reflecting an updated content, for example.

Figure 20:
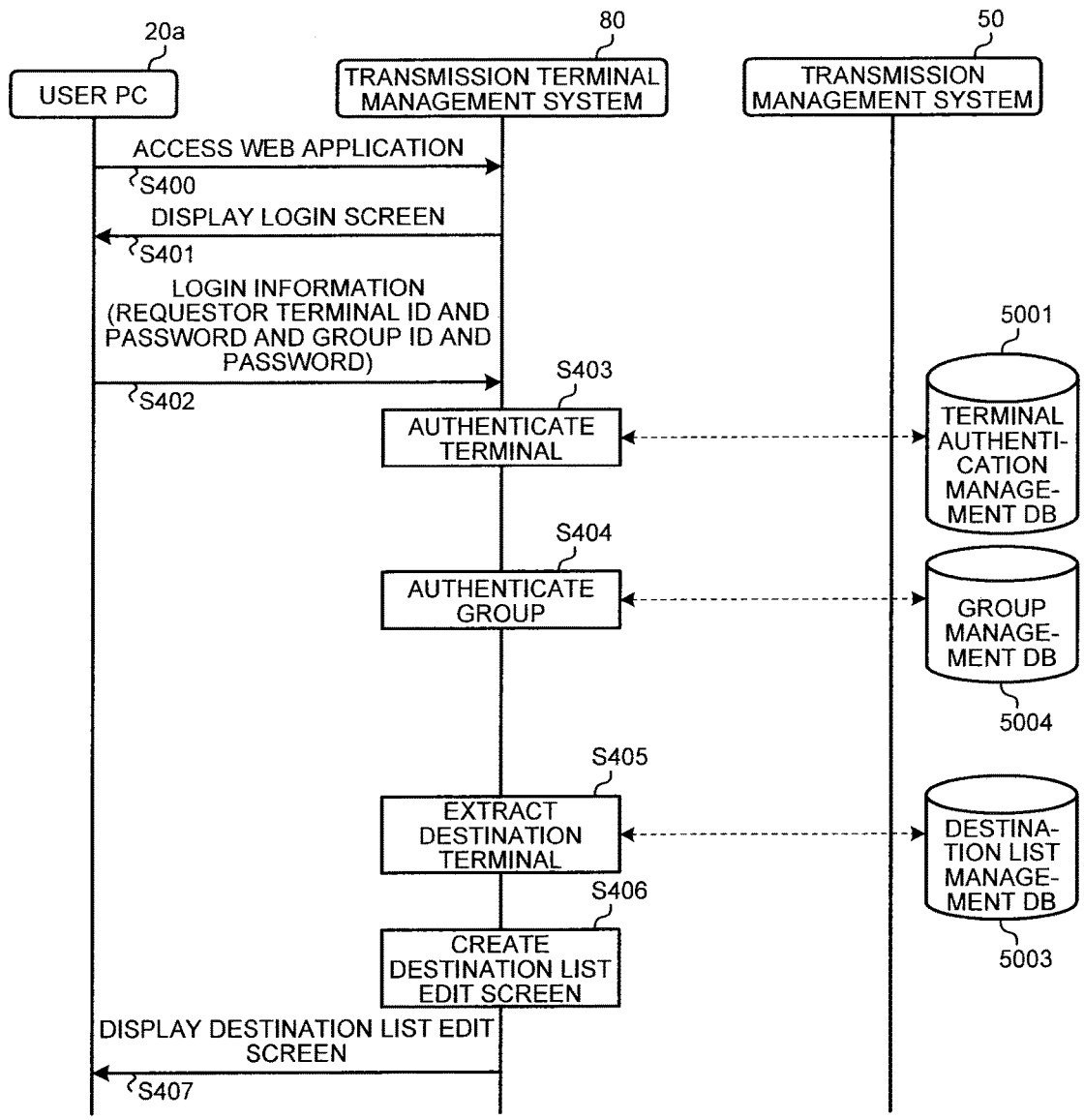
FIG. 20 is a sequence diagram of processing for editing destination information collectively in group units.

FIG. 20 and FIG. 21 are sequence diagrams of processing for editing destination information collectively in group units in the transmission system 1. In the same manner as in the processing illustrated in FIG. 14, an operation performed by the user a causes the user PC 20a to access the Web application provided by the transmission terminal management system 80 (Step S400), and the Web server function of the transmitting and receiving unit 81 of the transmission terminal management system 80 displays a login screen to the user PC 20a (Step S401).

In response to this, if the user a inputs a group ID of a group to be a target of editing and a password of the group besides the terminal ID of the requestor terminal (transmission terminal 10aa) and the password of the requestor terminal, the user PC 20a transmits login information including the terminal ID and the password of the requestor terminal and the group ID and the password of the group to be a target of editing to the transmission terminal management system 80 (Step S402).

The terminal authentication unit 82 of the transmission terminal management system 80 accesses the transmission management system 50 to search the terminal authentication management DB 5001 (refer to FIG. 7) established in the non-volatile storage unit 5000. The terminal authentication unit 82 then determines whether the same pair of a terminal ID and a password as the terminal ID and the password of the requestor terminal is managed, thereby authenticating the transmission terminal 10aa of the user a of the user PC 20a (Step S403).

Furthermore, the terminal authentication unit 82 searches the group management DB 5004 (refer to FIG. 10). The terminal authentication unit 82 then determines whether the same pair of a group ID and a password as the group ID and the password of the group to be a target of editing is managed, thereby authenticating that the transmission terminal 10aa belongs to the group to be a target of editing (Step S404).

If the authentication succeeds, the extracting unit 83 searches the destination list management DB 5003 (refer to FIG. 9) established in the non-volatile storage unit 5000 of the transmission management system 50 based on the terminal ID "10aa" of the requestor terminal, thereby extracting a terminal ID and a destination name of a destination terminal corresponding thereto (Step S405).

The destination list creating unit 84 creates an HTML of the destination list edit screen based on the terminal ID and the destination name thus extracted (Step S406). Subsequently, the Web server function of the transmitting and receiving unit 81 displays the destination list edit screen illustrated in FIG. 22 to the user PC 20a (Step S407).

The destination list edit screen displayed at Step S407 is a destination list edit screen for the group to which the requestor terminal belongs. The transmission terminals 10 belonging to a certain group in the group management DB 5004 (refer to FIG. 10) are registered in the destination lists of one another in the destination list management DB 5003 (refer to FIG. 9). On the destination list edit screen illustrated in FIG. 22, all the transmission terminals 10 belonging to the same group as that of the requestor terminal are displayed as targets to be edited in a selective manner.

In terms of the destination list edit screen, the destination list edit screen for the group and the destination list edit screen only for the requestor terminal can be switched to be displayed. On the destination list edit screen illustrated in FIG. 22, the destination list edit screen for the group is displayed by clicking on and selecting a tab of "T Corporation Japan Tokyo Office" with the mouse, and the destination list edit screen only for the transmission terminal 10aa serving as the requestor terminal is displayed by selecting a tab of "Japan Tokyo Office, terminal AA".

Subsequently, as illustrated in FIG. 21, the user a uses the user PC 20a to select a group to be a target of editing by selecting a tab on the destination list edit screen (Step S500). In a state where the user PC 20a is displaying the destination list edit screen for the group, a terminal to be a target of editing is selected by clicking on a link of "edit" for "Japan Tokyo Office, terminal AC" with the mouse, for example. As a result, an edit dialog similar to that illustrated in FIG. 17 is displayed on the destination list.

If an input performed by the user is completed and the user PC 20a receives an instruction of change completion (Step S501), the user PC 20a transmits the changed content to the transmission terminal management system 80 (Step S502). The changed content includes the group ID of the group to be a target of editing, the terminal ID of the destination terminal to be a target of the change, and the changed terminal name of the destination terminal. The changed content is further transmitted from the transmission terminal management system 80 to the transmission management system 50 (Step S503).

The storing and reading unit 59 of the transmission management system 50 uses the group ID as a search key to search the group management DB 5004 (refer to FIG. 10), thereby acquiring the terminal ID of the requestor terminal belonging to the group to be a target of editing (Step S504). Subsequently, the destination list management unit 57 searches for a pair of the terminal ID of the requestor terminal acquired at Step S504 and the terminal ID of the destination terminal related to the changed content among the destination terminals corresponding to the terminal ID of the requestor terminal from the destination list management DB 5003. The destination list management unit 57 then changes the terminal name of the destination terminal corresponding to the terminal ID of the destination terminal related to the changed content to a terminal name indicated in the changed content (Step S505).

Furthermore, if the group to be a target of editing includes the transmission terminal 10 whose power is turned on, the transmitting and receiving unit 51 of the transmission management system 50 transmits the changed content, that is, the updated terminal name of the destination terminal to the transmission terminal 10 whose power is turned on (Step S506 and Step S508). In the example illustrated in FIG. 21, because the power of the transmission terminals 10aa and 10ab is turned on, the transmitting and receiving unit 51 of the transmission management system 50 transmits the changed content to the transmission terminals 10aa and 10*ab* (Step S506 and Step S508). As a result, the transmission terminals 10*aa* and 10*ab* update the displayed content of the destination list with the changed content thus received (Steps S507 and S509). Thus, the processing for editing the destination information collectively in group units is completed.

If the "edit" link for the transmission terminal 10*ac* is selected and the terminal name is changed to "Japan Osaka Office, terminal AC", for example, all the terminal names of the destination terminals with the terminal ID "10*ac*" among the destination terminals associated with the requestor terminals that are the transmission terminals belonging to the group are updated with "Japan Osaka Office, terminal AC" in the destination list management table of the destination list management DB 5003 as illustrated in FIG. 23.

As described above, in the transmission system 1 according to the present embodiment, it is possible not only to change destination information, such as a terminal name of a destination terminal for a certain requestor terminal, but also to collectively edit destination information for a plurality of requestor terminals belonging to a group using the user PC 20. With this configuration, if destination information, such as a destination name of a destination terminal needs to be collectively changed in all the transmission terminals (requestor terminals) located in a certain office, the destination information can be changed not in each requestor terminal but in a group unit collectively. In other words, the user can set and change display items and the like with a simple operation.

In the transmission system 1 according to the present embodiment, the destination information only for a requestor terminal can be edited only when authentication using the terminal ID and the password of the requestor terminal succeeds. Furthermore, in the transmission system 1 according to the present embodiment, the destination information for a group can be edited only when authentication using the terminal ID of the requestor terminal and the password of the requestor terminal succeeds and when authentication using the group ID and the password of the group succeeds. With this configuration, it is possible to prevent a third party from illegally changing the destination information.

Second Embodiment

Figure 24:
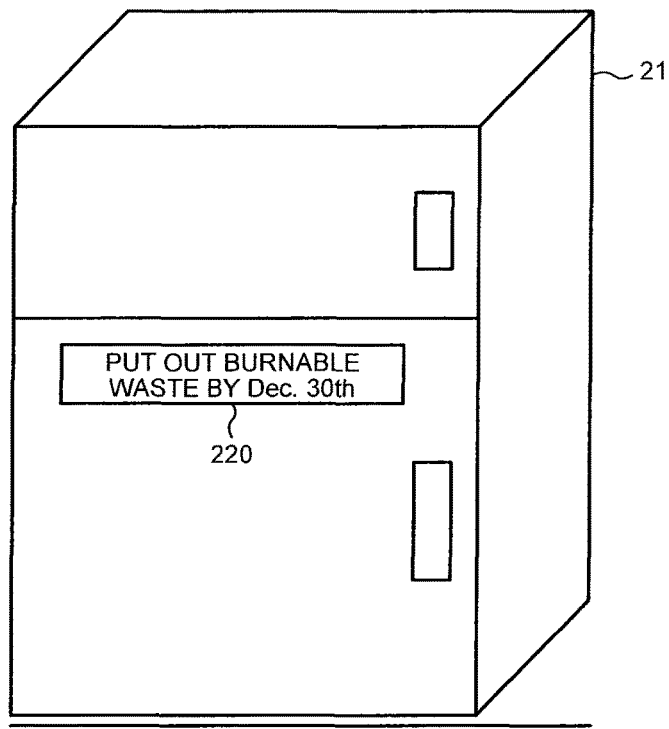
FIG. 24 is a view of an external configuration of a home electrical appliance according to a second embodiment of the present invention.

In a second embodiment of the present invention, an example will be made of the case where a transmission terminal 21 is a home electrical appliance that can be connected to a network, such as a network home electrical appliance. The transmission terminal 21 is hereinafter referred to as a home electrical appliance 21 as appropriate. FIG. 24 is a view of an external configuration of the home electrical appliance 21. The home electrical appliance 21 illustrated in FIG. 24 is a refrigerator and includes a display 220. The display 220 displays display information, such as a note of "put out burnable waste by Dec. 30th" registered by a user, for example.

A transmission system according to the second embodiment collectively manages the display information displayed on the display 220 of a plurality of home electrical appliances 21 included in the transmission system in a unit of a group to which the home electrical appliances 21 belong. Specifically, if the same display information is desired to be displayed on the home electrical appliances 21 included in the transmission system according to the second embodiment, the transmission system does not register the display information in each of the home electrical appliances 21 but edits the display information in a group unit similarly to the transmission system 1 according to the first embodiment. Thus, the transmission system according to the second embodiment can change the display information displayed on the display 220 of the home electrical appliances 21 belonging to the group.

Similarly to the transmission terminal 10, the home electrical appliance 21 is connected to other apparatuses in a communicable manner via the LAN 2*a*. The hardware configuration of the home electrical appliance 21 is nearly the same as that of the transmission terminal 10 explained with reference to FIG. 2 and FIG. 3. However, the home electrical appliance 21 does not necessarily include the camera 112, the microphone 114, and the speaker 115. Whether these components are included depends on the types of the home electrical appliance 21. Examples of the home electrical appliance 21 include a microwave, a rice cooker, and a washing machine in addition to a refrigerator.

Figure 25:
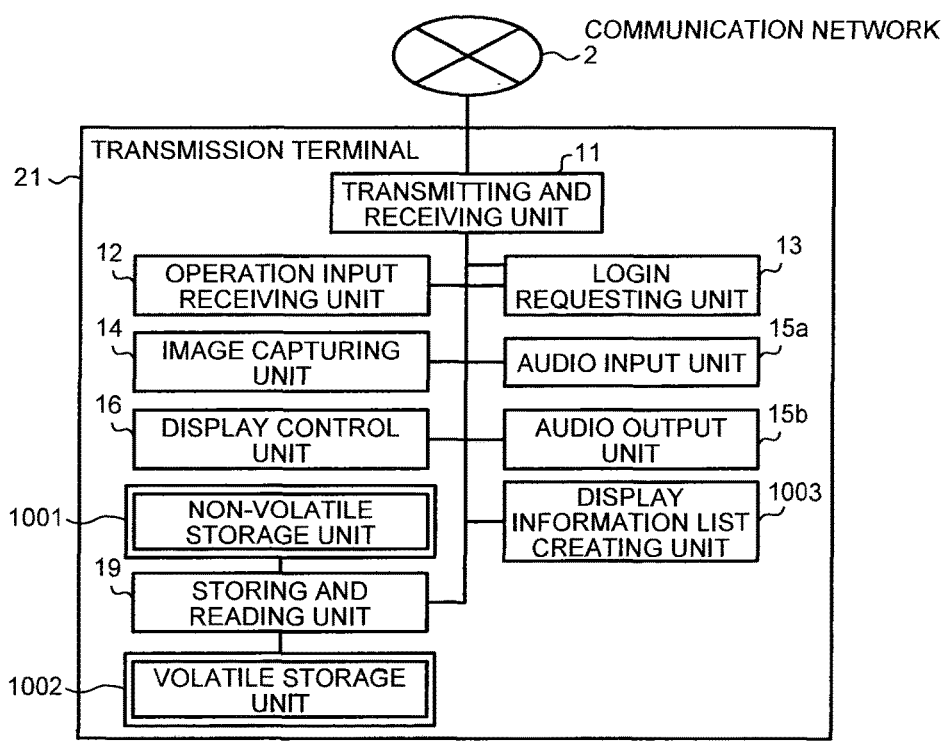
FIG. 25 is a diagram of a functional configuration of a transmission terminal.

FIG. 25 is a diagram of a functional configuration of the transmission terminal 21. The transmission terminal 21 includes a display information list creating unit 1003. The display information list creating unit 1003 receives display information from a transmission management system 58, which will be described later, to create a display information list illustrated in FIG. 26 based on the display information. The display information received from the transmission management system 58 includes the terminal ID identifying the transmission terminal 21 and the content of a note serving as the display information. The transmission terminal 21 does not necessarily include the destination list creating unit 18.

Figures 27, 28:
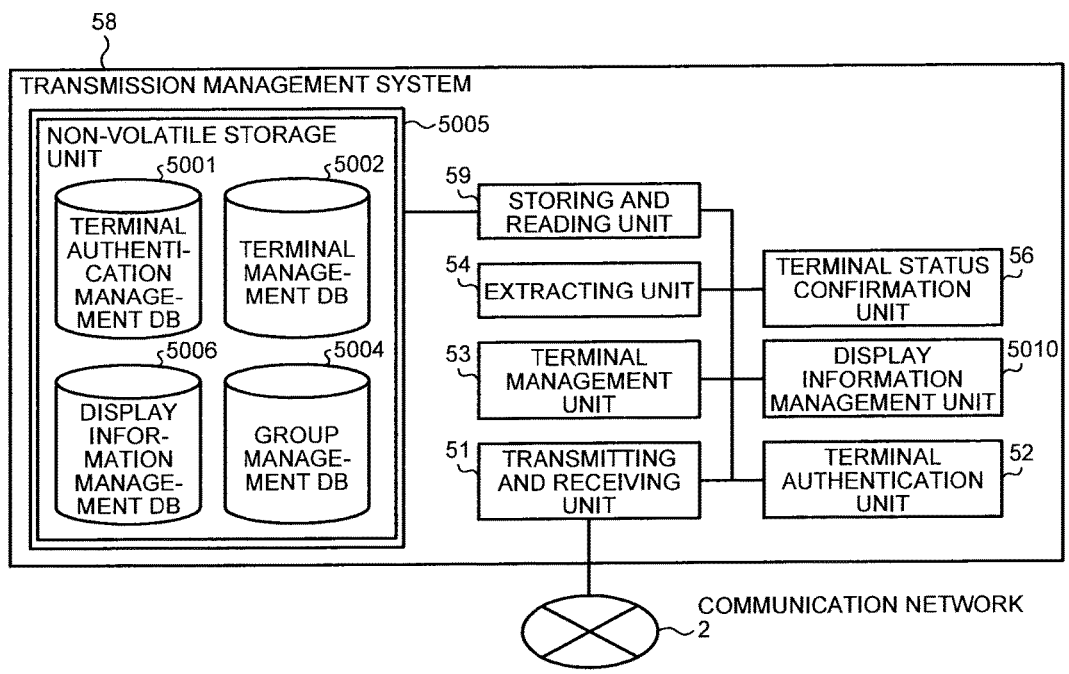
FIG. 27 is a diagram of a functional configuration of a transmission management system.
FIG. 28 is a conceptual diagram of a display information management table.

FIG. 27 is a diagram of a functional configuration of the transmission management system 58. The transmission management system 58 includes a display information management unit 5010. A non-volatile storage unit 5005 of the transmission management system 58 includes a display information management DB 5006.

The display information management DB 5006 has a display information management table illustrated in FIG. 28. In the display information management table, a transmission terminal ID and the content of a note serving as the display information are managed in association with each other.

The display information management table illustrated in FIG. 28 stores therein the fact that the display information displayed on the display 220 of the transmission terminal 21 with a terminal ID "21*aa*" is "put out burnable waste by Dec. 30th", for example.

In the transmission system according to the second embodiment, the note for the transmission terminal 21 can be arbitrarily set or changed by the user of the transmission terminal 21, for example. Furthermore, for example, it may be desired to collectively change all the notes displayed on the display 220 of home electrical appliances located in a kitchen. In the transmission system according to the second embodiment, by registering the transmission terminals 21 to be targets of such collective change in the same group in a group management table of the group management DB 5004, it is possible to collectively change the notes in a group unit. The processing for changing notes will be described later in detail.

Figures 29, 30:
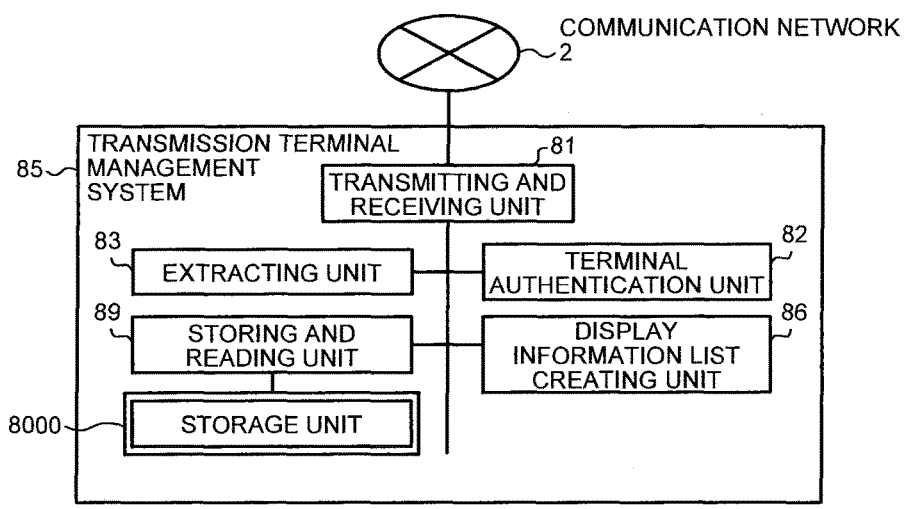
FIG. 29 is a conceptual diagram of a group management table.
FIG. 30 is a diagram of a functional configuration of a transmission terminal management system.

FIG. 29 illustrates data of the group management table included in the group management DB 5004 according to the second embodiment. In the transmission system according to the second embodiment, the home electrical appliances 21 serving as transmission terminals are classified into groups in located place units of the home electrical appliances 21. In the example illustrated in FIG. 29, the home electrical appliances 21 identified by terminal IDs of 21*aa* and 21*ab* belong to a group name "kitchen", for example.

Referring back to FIG. 27, the display information management unit 5010 is realized by an instruction issued from the CPU 201 illustrated in FIG. 4 and adds, changes, and deletes, that is, updates a note stored in the display information management DB 5006.

The transmission management system 58 does not necessarily include the destination list management unit 57, and the non-volatile storage unit 5005 does not necessarily include the destination list management DB 5003.

FIG. 30 is a diagram of a functional configuration of a transmission terminal management system 85. The transmission terminal management system 85 includes a display information list creating unit 86, the storing and reading unit 89, and the storage unit 8000. The display information list creating unit 86 is realized by an instruction issued from the CPU 201 illustrated in FIG. 4 and creates an HTML of a display information list edit screen illustrated in FIG. 33. The display information list edit screen is a screen that receives user operations such as editing of a note to be displayed on a certain transmission terminal 21. The transmission terminal management system 85 does not necessarily include the destination list creating unit 84.

Figure 31:
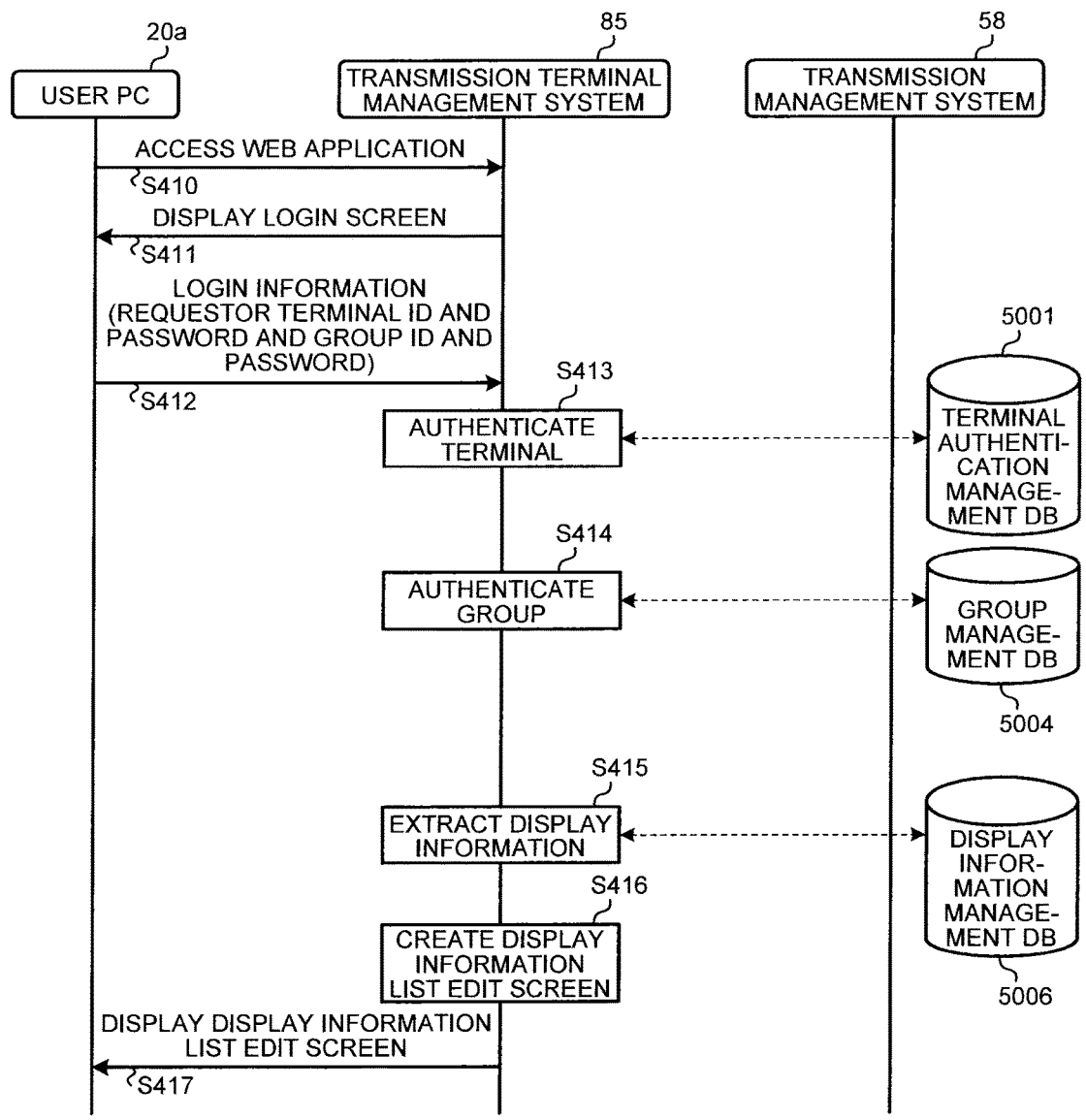
FIG. 31 is a sequence diagram of processing for editing display information collectively in group units.
Figure 32:
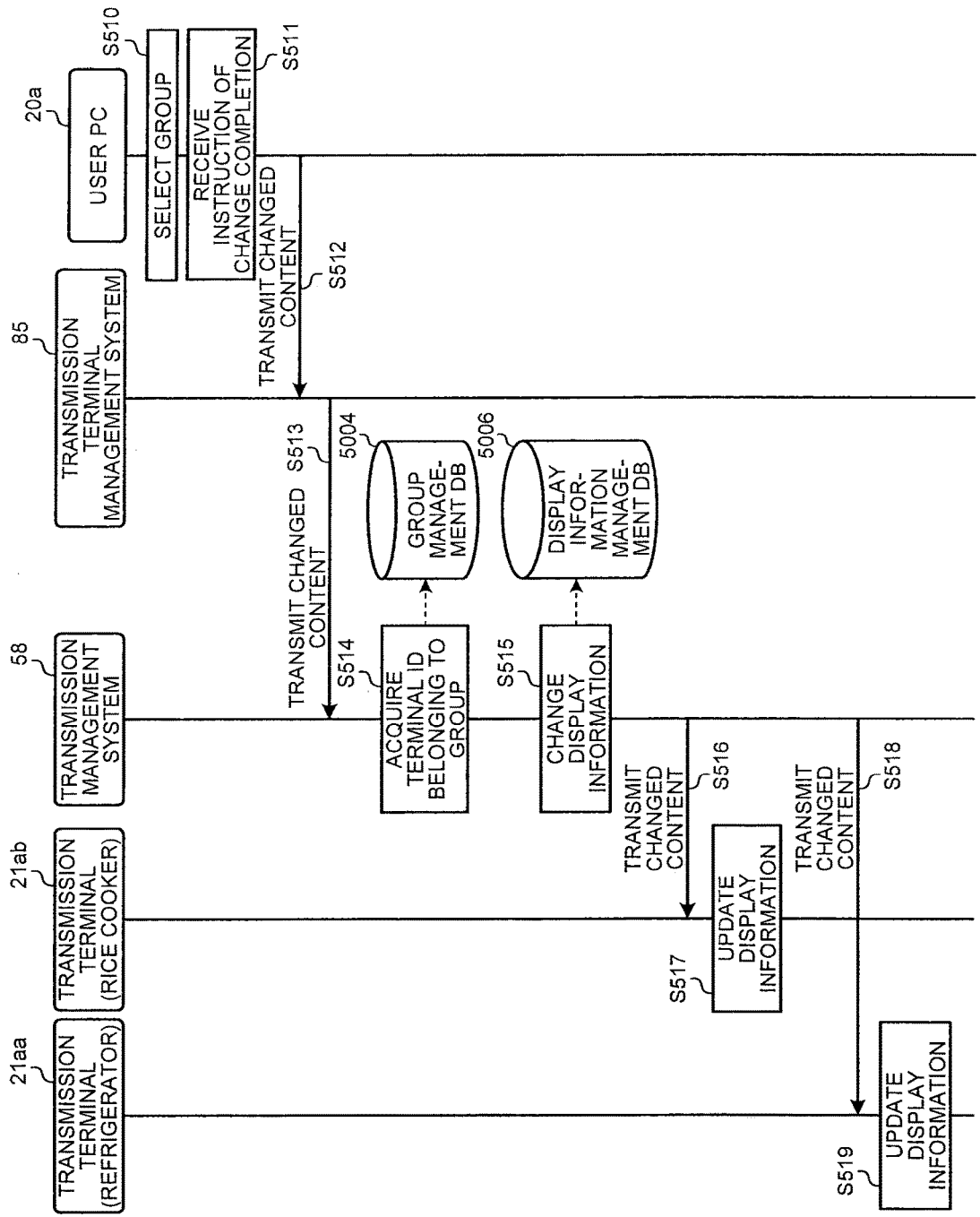
FIG. 32 is another sequence diagram of processing for editing display information collectively in group units.

FIG. 31 and FIG. 32 are sequence diagrams of processing for editing display information collectively in group units in the transmission system according to the second embodiment. Processing from Step S410 to Step S414 in the processing for displaying the display information list edit screen is the same as that from Step S400 to Step S404 in FIG. 20 explained in the first embodiment.

After the group authentication (Step S414), the extracting unit 83 of the transmission terminal management system 80 extracts terminal IDs of terminals and display information from the display information management DB 5006 (FIG. 28) established in the non-volatile storage unit 5005 (Step S415).

Figure 33:
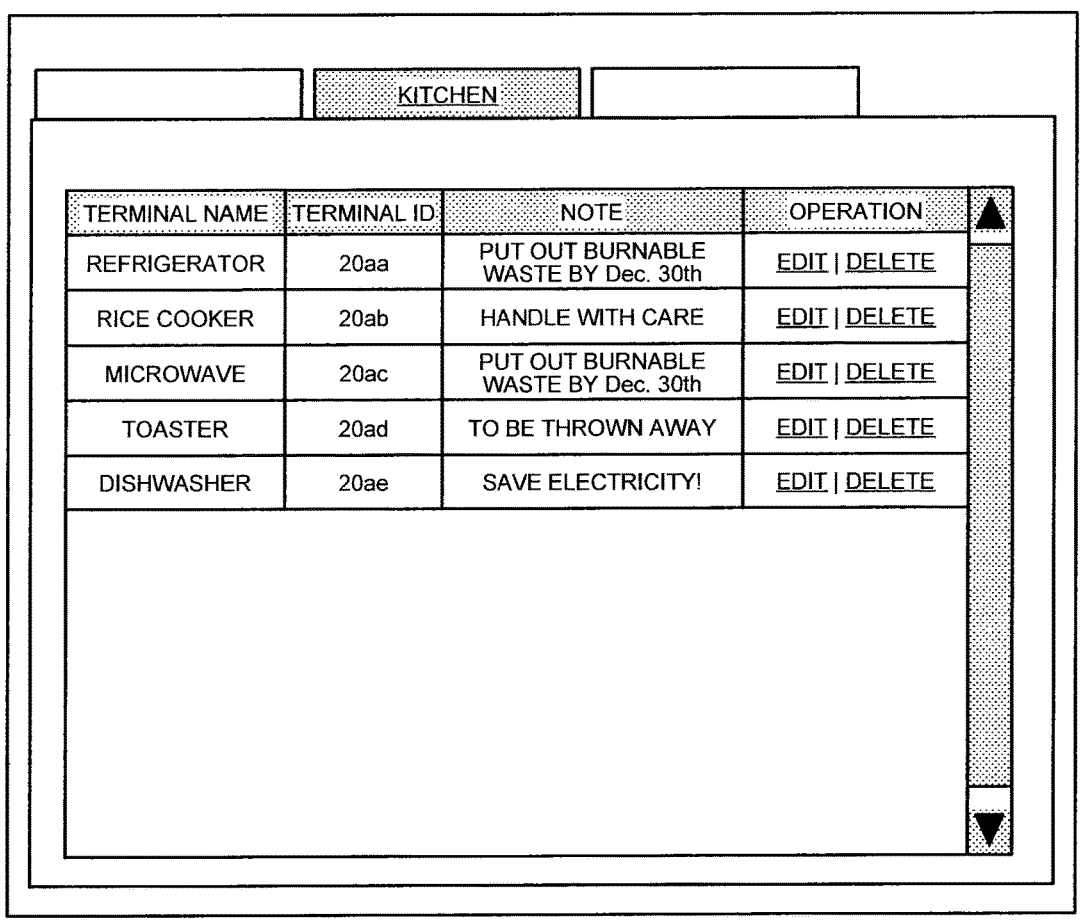
FIG. 33 is a conceptual diagram of a display information list edit screen.

The display information list creating unit 86 creates an HTML of the display information list edit screen illustrated in FIG. 33 based on the terminal IDs and the display information thus extracted (Step S416). Subsequently, a Web server function of the transmitting and receiving unit 81 displays the display information list edit screen to the user PC 20*a* (Step S417). Thus, the processing for displaying the display information list edit screen is completed.

As illustrated in FIG. 33, the display information list edit screen displays an operation area for editing and deleting the content of a note to be displayed on the display 220 of the transmission terminal 21. By clicking on a link of "edit" for "refrigerator", for example, an edit screen for editing the note for the terminal name "refrigerator" can be opened.

FIG. 32 is a sequence diagram of processing for editing a note in the transmission system 3. Processing from Step S510 to Step S519 in FIG. 32 is nearly the same as that from Step S500 to Step S509 in FIG. 21 explained in the first embodiment. In the present embodiment, the user PC 20*a* receives an instruction of a changed content related to a change in the display information serving as a note at Step S511. The changed content is transmitted to the transmission management system 58 via a Web application of the transmission terminal management system 85 (Step S512 and Step S513).

At Step S514, the storing and reading unit 59 of the transmission management system 50 uses a group ID as a search key to acquire the terminal IDs of transmission terminals belonging to the group (Step S514). Subsequently, the display information management unit 5010 changes display information associated with the terminal IDs acquired at Step S514 with the changed content in the display information management DB 5006 (Step S515).

Furthermore, if the group to be a target of editing includes a transmission terminal 21 whose power is turned on, the transmitting and receiving unit 51 transmits the changed content, that is, the changed display information to the transmission terminal 21 whose power is turned on (Step S516 and Step S518). As a result, the transmission terminals 21 that receive the changed display information (a refrigerator 21*aa* and a rice cooker 21*ab* in the example of FIG. 32) update the display information to be displayed on the display 220 with the changed content (Step S517 and Step S519). Thus, the processing for editing the display information collectively in group units is completed.

If the "edit" link for the rice cooker is selected and the note is changed to "the power supply will be cut off tomorrow", for example, the display information for all the home electrical appliances 21 belonging to the group with the group name "kitchen" to which the rice cooker 21*ab* belongs is updated with "the power supply will be cut off tomorrow" in the display information management table of the display information management DB 5006 as illustrated in FIG. 34.

As described above, in the transmission system according to the second embodiment, it is possible to collectively change the display information for a plurality of home electrical appliances. In other words, the user can change the display information with a simple operation.

The relay apparatus 30, the transmission management systems 50 and 58, the transmission terminal management systems 80 and 85, the program providing system 90, and the maintenance system 100 in the first and the second embodiments may be realized by a single computer or by a plurality of computers to which the units (functions or units) are divided and allocated arbitrarily. If the program providing system 90 is realized by a single computer, the computer program transmitted by the program providing system 90 may be transmitted in a manner divided or not divided into a plurality of modules. By contrast, if the program providing system 90 is realized by a plurality of computers, the computer program may be transmitted from the computers in a manner divided into a plurality of modules.

The recording medium storing therein the terminal program, the relay apparatus program, the transmission management program, or the transmission terminal management system program, the HD 204 storing therein these computer programs, and the program providing system 90 including the HD 204 according to the first and the second embodiments are used as computer program products to provide the terminal program, the relay apparatus program, the transmission management program, and the transmission terminal management system program to a user in Japan or abroad, for example.

While the explanation has been made of the case where the transmission system 1 is the video conference system in the first embodiment, for example, it is not limited thereto. The transmission system 1 may be a telephone system, such as Internet protocol (IP) phone and Internet phone. Alternatively, the transmission system 1 may be a car navigation system. In this case, for example, one of the transmission terminals 10 corresponds to a car navigation device equipped in a vehicle, and the other of the transmission terminals 10 corresponds to a management terminal or a management server of a management center that manages the car navigation device or to a car navigation device mounted on another vehicle.

Still alternatively, the transmission system 1 may be a communication system of a mobile phone. In this case, for example, the transmission terminal 10 corresponds to a mobile phone.

While the explanation has been made of the case where the content data is image data serving as sight data and audio data serving as hearing data in the first embodiment, for example, it is not limited thereto. The content data may be another five-sense data. If the content data is touch data, for example, a sense obtained by a user making a contact in one terminal is transmitted to the other terminal. Furthermore, if the content data is smell data, a smell (an odor) in one terminal is transmitted to the other terminal. Moreover, if the content data is taste data, a taste in one terminal is transmitted to the other terminal.

The content data may be at least one piece of data among the image (sight) data, the audio (hearing) data, the touch data, the smell data, and the taste data.

While the explanation has been made of the case where the transmission system 1 is used for holding a video conference in the first embodiment, it is not limited thereto. The transmission system 1 may be used for a meeting, a typical conversation between family members and between friends, or unidirectional presentation of information, for example.

According to the embodiments, it is possible to simplify user operations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communication network such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communication network such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A transmission management apparatus for managing transmission among a plurality of transmission terminals connected to a network, the transmission management apparatus comprising:

a display information memory to store therein, in association with one another, group identification information for identifying groups to which the transmission terminals each belong, transmission terminal identification information for identifying the transmission terminals belonging to the respective groups, and display information to be displayed on the transmission terminals belonging to the groups;

acquiring circuitry configured to acquire the group identification information of a certain group and a change instruction for changing the display information;

changing circuitry configured to change the display information to be displayed on the transmission terminal belonging to the certain group identified by the group identification information acquired by the acquiring circuitry in the display information memory based on the change instruction; and a transmitter configured to transmit the display information associated with the certain group in the display information memory and changed by the changing circuitry to the transmission terminals belonging to the certain group which are identified by the transmission terminal identification information associated with the group identification information of the certain group in the display information memory.

2. The transmission management apparatus according to claim 1, further comprising:

a first authentication information memory to store therein first authentication information for authenticating a user who uses the transmission terminal belonging to the group, in association with the group identification information of the group to which the transmission terminal of the user belongs, the first authentication information being acquired the acquiring circuitry; and authentication circuitry configured to determine whether the first authentication information acquired by the acquiring circuitry and the group identification information are stored in association with each other in the first authentication information memory, the authentication circuitry being configured to determine that authentication is successful when the first authentication information acquired by the acquiring circuitry and the group identification information are stored in association with each other in the first authentication information memory, wherein the changing circuitry changes, when the authentication by the authentication circuitry is successful, the display information associated with the group identification information in the display information memory based on the change instruction.

3. The transmission management apparatus according to claim 2, wherein the acquiring circuitry further acquires the transmission terminal identification information, and the authentication circuitry determines, in reference to the display information memory, whether the transmission terminal associated with the transmission terminal identification information acquired by the acquiring circuitry and identified by the transmission terminal identification information belongs to the certain group, and determines that the authentication is successful when the transmission terminal belongs to the certain group.

4. The transmission management apparatus according to claim 3, further comprising:

a second authentication information memory to store therein second authentication information for authenticating a user who uses the transmission terminal, in association with the transmission terminal identification information of the transmission terminal used by the user, wherein the acquiring circuitry acquires the second authentication information, and the authentication circuitry determines whether the second authentication information acquired by the acquiring circuitry and the transmission terminal identification information are stored in association with each other in the second authentication information memory and determines that the authentication of the user is successful when the second authentication information acquired by the acquiring circuitry and the transmission terminal identification information are stored in association with each other in the second authentication information memory.

5. The transmission management apparatus according to claim 4, wherein the second authentication information is different authentication information from the first authentication information.

6. A transmission system comprising:

a transmission management apparatus configured to manage transmission among a plurality of transmission terminals connected to a network; and a transmission terminal management apparatus configured to manage the transmission terminals, wherein the transmission terminal management apparatus includes a receiver configured to receive group identification information for identifying a group to which the transmission terminal used by a user belongs and a change instruction for changing displaying information to be displayed on the transmission terminal from a user terminal; and a transmitter configured to transmit the group identification information and the change instruction received by the receiver to the transmission management apparatus, and the transmission management apparatus includes a receiver configured to receive the group identification information and the change instruction from the transmission terminal management apparatus;

a display information memory configured to store therein, in association with one another, group identification information for identifying groups to which the transmission terminals each belong, transmission terminal identification information for identifying the transmission terminals belonging to the respective groups, and display information to be displayed on the transmission terminals belonging to the groups;

changing circuitry configured to change the display information to be displayed on the transmission terminals belonging to the certain group identified by the group identification information received by the receiver in the display information memory based on the change instruction; and a transmitter configured to transmit the display information associated with the certain group in the display information memory and changed by the changing circuitry to the transmission terminals belonging to the certain group and which are identified by the transmission terminal identification information associated with the group identification information of the certain group in the display information memory.

7. A non-transitory computer-readable recording medium with an executable program stored thereon for managing transmission among a plurality of transmission terminals connected to a network by a computer that includes a display information memory to store therein, in association with one another, group identification information for identifying groups to which the transmission terminals each belong, transmission terminal identification information for identifying the transmission terminals belonging to the respective groups, and display information to be displayed on the transmission terminals belonging to the groups, wherein the program instructs the computer to perform:

acquiring the group identification information of a certain group and a change instruction for changing the display information;

changing the display information to be displayed on the transmission terminals belonging to the certain group identified by the acquired group identification information in the display information memory based on the change instruction; and transmitting the display information associated with the certain group in the display information memory and changed at the changing to the transmission terminals belonging to the certain group which are identified by the transmission terminal identification information associated with the group identification information of the certain group in the display information memory.

* * * * *